(12) United States Patent
Horita

(10) Patent No.: US 6,396,806 B1
(45) Date of Patent: May 28, 2002

(54) TRANSMISSION LINE DUPLEXING PROCESSING METHOD AND APPARATUS THEREOF, AND RECORDING MEDIUM FOR RECORDING ITS PROCESSING PROCEDURE

(75) Inventor: Kazuo Horita, Tokyo (JP)

(73) Assignee: Kabushiki Kaisha Toshiba, kawasaki (JP)

( * ) Notice: Subject to any disclaimer, the term of this patent is extended or adjusted under 35 U.S.C. 154(b) by 0 days.

(21) Appl. No.: 09/154,043

(22) Filed: Sep. 16, 1998

(30) Foreign Application Priority Data

Sep. 17, 1997 (JP) .............................................. 9-251658

(51) Int. Cl.$^7$ .............................................. G01R 31/08
(52) U.S. Cl. ...................................... 370/227; 370/242
(58) Field of Search ................................ 370/276, 282, 370/216–228, 241, 242, 248, 249, 252, 469

(56) References Cited

U.S. PATENT DOCUMENTS 5,153,874 A 10/1992 Kohno
5,867,689 A * 2/1999 McLain, Jr. ................. 395/500

FOREIGN PATENT DOCUMENTS

| EP | 0301500 | 2/1989 |
|---|---|---|
| JP | 62-105550 | 5/1987 |
| JP | 1-175036 | 12/1989 |
| JP | 2-250538 | 10/1990 |
| JP | 2-308638 | 12/1990 |
| JP | 05235803 | 10/1993 |
| JP | 6-21925 | 1/1994 |
| JP | 6-29961 | 2/1994 |
| JP | 08223185 | 8/1996 |
| JP | 9-130408 | 5/1997 |

OTHER PUBLICATIONS

Search report from the British Patent Office, Apr. 1, 1999.

* cited by examiner

Primary Examiner—David Vincent
(74) Attorney, Agent, or Firm—Finnegan, Henderson, Farabow, Garrett & Dunner, L.L.P.

(57) ABSTRACT

A transmission line duplexing processing method comprises the steps of installing duplex transmission line between a plurality of terminal devices, the duplex transmission line being duplicated by first and second transmission lines, making it possible to send and receive data of a stream unit train between the terminal devices by using a TCP protocol, sending the data of the stream unit train simultaneously to the transmission lines, receiving data, and handling only data which is included in the data sent at the sending step and which has arrived earlier, as received data, detecting an abnormality caused on either of the first and second transmission lines, and responding to detection of occurrence of the abnormality on the transmission line conducted at the abnormality detecting step, to close the transmission line having the abnormality and conduct sending and receiving by using a remaining normal transmission line.

13 Claims, 32 Drawing Sheets

+00 | CONNECTION MANAGEMENT TABLE (14336 BYTES)

FIG. 5A

| Offset | Connection Info | | Offset | Field |
|---|---|---|---|---|
| +00h | CONNECTION INFORMATION 1 | | +00h | USE STATE |
| +34h | CONNECTION INFORMATION 2 | | +02h | SOCKET TYPE |
| +68h | CONNECTION INFORMATION 3 | | +04h | SOCKET FOR A LINE |
| | | | +08h | SOCKET FOR B LINE |
| | | | +0Ch | IP ADDRESS OF THE OTHER PARTY A LINE |
| +33CCh | CONNECTION INFORMATION 256 | | +10h | IP ADDRESS OF THE OTHER PARTY B LINE |
| | | | +14h | ITS OWN PORT NUMBER |
| | | | +16h | THE OTHER PARTY PORT NUMBER |
| | | | +18h | SENDING COUNTER |
| | | | +1Ch | A LINE SENDING COUNTER |
| | | | +20h | B LINE SENDING COUNTER |
| | | | +24h | RECEIVING COUNTER |
| | | | +28h | A LINE RECEIVING COUNTER |
| | | | +2Ch | B LINE RECEIVING COUNTER |
| | | | +30h | SENDING SIZE OF THE OTHER PARTY |
| | | | +34h | SENDING DIFFERENCE STORING BUFFER POINTER |

FIG. 5B

| | |
|---|---|
| USE STATE | 0/ TABLE OCCUPIED: WHEN THE TABLE IS OCCUPIED, BUT IT IS NOT YET KNOWN FOR WHICH OF THE CLIENT, SERVER AND REPRESENTATIVE SOCKET THE TABLE IS USED, THIS VALUE IS OBTAINED. FOR EXAMPLE, THIS VALUE IS USED WHILE A CONNECTION REQUEST IS BEING ISSUED<br>1/ FOR CLIENT: SOCKET OBTAINED BY ESTABLISHMENT OF AN ACTIVE CONNECTION<br>2/ FOR SERVER: SOCKET OBTAINED BY ESTABLISHMENT OF A PASSIVE CONNECTION<br>3/ REPRESENTATIVE SOCKET: SOCKET TO BE USED FOR ESTABLISHING A PASSIVE CONNECTION<br>-1/ TABLE NOT OCCUPIED |
| SOCKET TYPE | TYPE OF SOCKET.<br>0/ TCP SOCKET 1/ UDP SOCKET 2/ UNIX DOMAIN  INITIAL VALUE IS -1 |
| SOCKET FOR A LINE | SOCKET FOR A LINE. INITIAL VALUE OR WHEN NOT OCCUPIED: -1 |
| SOCKET FOR B LINE | SOCKET FOR B LINE. INITIAL VALUE OR WHEN NOT OCCUPIED: -1 |
| IP ADDRESS OF THE OTHER PARTY A LINE | IP ADDRESS OP A LINE OF THE OTHER PARTY STATION FOR WHICH THE CONNECTION HAS BEEN ESTABLISHED. INITIAL VALUE IS -1 |
| IP ADDRESS OF THE OTHER PARTY B LINE | IP ADDRESS OF B LINE OF THE OTHER PARTY STATION FOR WHICH THE CONNECTION HAS BEEN ESTABLISHED. INITIAL VALUE IS -1 |
| ITS OWN PORT NUMBER | PORT NUMBER OF ITS OWN STATION BOUND TO THE SOCKET.<br>INITIAL VALUE, OR WHEN NOT OCCUPIED: -1 |
| THE OTHER PARTY PORT NUMBER | PORT NUMBER OF THE OTHER PARTY STATION BOUND TO THE SOCKET.<br>INITIAL VALUE, OR WHEN NOT OCCUPIED: -1 |

FIG. 6A

| | |
|---|---|
| SENDING COUNTER | ACCUMULATED VALUE OF THE NUMBER OF SENT BYTES. A GREATER VALUE OUT OF A LINE SENDING COUNTER AND B LINE SENDING COUNTER |
| A LINE SENDING COUNTER | ACCUMULATED VALUE OF THE NUMBER OF SENT BYTES IN THE A LINE. INITIAL VALUE, OR WHEN THE CONNECTION IS NOT YET ESTABLISHED: −1 |
| B LINE SENDING COUNTER | ACCUMULATED VALUE OF THE NUMBER OF SENT BYTES IN THE B LINE. INITIAL VALUE, OR WHEN THE CONNECTION IS NOT YET ESTABLISHED: −1 |
| RECEIVING COUNTER | ACCUMULATED VALUE OF RECEIVED DATA DELIVERED TO THE USER. A GREATER VALUE OUT OF A LINE RECEIVING COUNTER AND B LINE RECEIVING COUNTER |
| A LINE RECEIVING COUNTER | ACCUMULATED VALUE OF THE NUMBER OF BYTES RECEIVED IN THE A LINE. SUCH A STATE THAT RECEIVING HAS NOT BEEN CONDUCTED AFTER CONNECTION ESTABLISHMENT/ −1. WAITING FOR RECEIVING OF THE OPPOSITE SYSTEM:/ 80000000h. |
| B LINE RECEIVING COUNTER | ACCUMULATED VALUE OF THE NUMBER OF BYTES RECEIVED IN THE B LINE. SUCH A STATE THAT RECEIVING HAS NOT BEEN CONDUCTED AFTER CONNECTION ESTABLISHMENT/ −1. WAITING FOR RECEIVING OF THE OPPOSITE SYSTEM/ 80000000h |
| SENDING SIZE OF THE OTHER PARTY SYSTEM | SENDING SIZE OF THE OTHER PARTY SYSTEM CONTAINED IN THE HEADER OBTAINED BY THE FIRST RECEPTION AFTER CONNECTION ESTABLISHMENT |
| SENDING DIFFERENCE PRESERVING BUFFER POINTER | POINTER TO THE BUFFER FOR PRESERVING THE SENDING DIFFERENCE DATA. INITIAL VALUE IS NULL. THE BUFFER FOR PRESERVING THE SENDING DIFFERENCE DATA IS ACQUIRED WHEN A DIFFERENCE HAS OCCURRED |

FIG. 6B

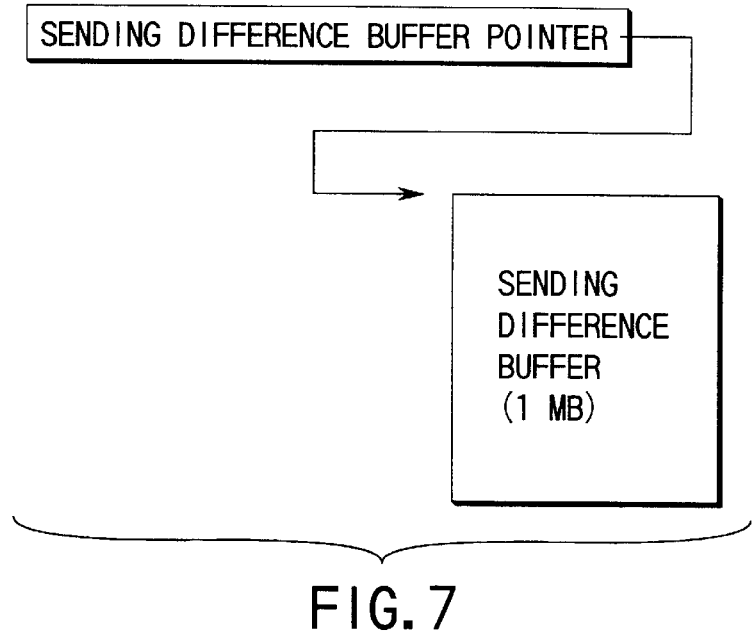

FIG. 7

```
INDX:TABLE INDEX NUMBER OF CONNECTION MANAGEMENT TABLE
STATE:USE STATE                    type:SOCKET TYPE
So-A:SOCKET FOR A LINE             So-B:SOCKET FOR B LINE
IP-A:A LINE IP ADDRESS             IP-B:B LINE IP ADDRESS
S-Port:ITS OWN PORT NUMBER
D-Port:THE OTHER PARTY
       PORT NUMBER
Send-A:A LINE SENDING COUNTER      Send-B:B LINE SENDING
Send:SENDING COUNTER                      COUNTER
Recv-A:A LINE RECEIVING COUNTER    Recv-B:B LINE
Recv:RECEIVING COUNTER                    RECEIVING COUNTER
DIFFERENCE buff:SENDING
               DIFFERENCE BUFFER
HEADER:SENDING SIZE OF THE
       OTHER PARTY SYSTEM
DUPLICATION:DUPLICATION
            PROCESSING
```

FIG. 8

1) THE USER APPLICATION REQUESTS THE SOCKET NUMBER 3 TO BE BOUND WITH A PORT NUMBER 1000 AND AN IP ADDRESS 0.0.0.0. THE IP ADDRESS 0.0.0.0. MEANS THAT AN ADDRESS IS NOT SPECIFIED. IN THE CASE OF ESTABLISHMENT OF A PASSIVE CONNECTION, TYPICALLY IT IS NOT KNOWN FROM WHICH NODE A CONNECTION REQUEST IS ISSUED, AND CONSEQUENTLY THE BINDING IS EFFECTED AT THE IP ADDRESS 0.0.0.0

| INDEX | STATE | type | So-A | So-B | IP-A | IP-B | S-Port | D-Port |
|---|---|---|---|---|---|---|---|---|
| 1 | 1 | 0 | 100 | 102 | 01h | 81h | 1028 | 1030 |
| 2 | 1 | 0 | 110 | 112 | 02h | 82h | 1038 | 1040 |
| 3 | 0 | 0 | 120 | -1 | -1 | -1 | -1 | -1 |

2) THE SOCKET SPECIFIED BY THE APPLICATION IS AN INDEX NUMBER OF THE CONNECTION MANAGEMENT TABLE

3) THE SOCKET FOR THE A LINE IS TAKEN OUT, AND IT IS BOUND WITH THE PORT NUMBER 1000 AND THE IP ADDRESS 0.0.0.0. SPECIFIED BY THE USER APPLICATION

4) THE BOUND PORT NUMBER AND IP ADDRESS ARE STORED

| INDEX | STATE | type | So-A | So-B | IP-A | IP-B | S-Port | D-Port |
|---|---|---|---|---|---|---|---|---|
| 1 | 1 | 0 | 100 | 102 | 01h | 81h | 1028 | 1030 |
| 2 | 1 | 0 | 110 | 112 | 02h | 82h | 1038 | 1040 |
| 3 | 0 | 0 | 120 | -1 | 00h | -1 | 1000 | -1 |

FIG. 10

5) AN ESTABLISHMENT REQUEST OF THE CONNECTION OF THE B LINE IS CONDUCTED. IN THE SAME WAY AS THE A LINE, A REQUEST IS MADE TO THE REPRESENTATIVE SOCKET. THE IP ADDRESS OF THE B LINE IS SET TO THE ADDRESS OF THE A LINE+80h

CLIENT SIDE CONNECTION MANAGEMENT TABLE STATE

| INDEX | STATE | type | So-A | So-B | IP-A | IP-B | S-Port | D-Port |
|-------|-------|------|------|------|------|------|--------|--------|
| 1 | 1 | 0 | 130 | 140 | 03h | -1 | 1400 | 1000 |

SERVER SIDE CONNECTION MANAGEMENT TABLE STATE

| INDEX | STATE | type | So-A | So-B | IP-A | IP-B | S-Port | D-Port |
|-------|-------|------|------|------|------|------|--------|--------|
| 3 | 3 | 0 | 120 | -1 | 00h | -1 | 1000 | -1 |
| 4 | 2 | 0 | 150 | -1 | 05h | -1 | 1000 | 1400 |

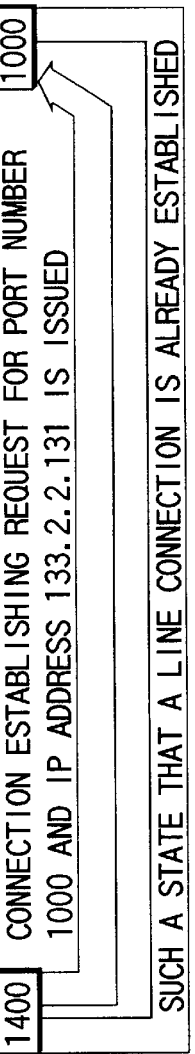

FIG. 16

| INDX | So-A | So-B | Send-A | Send-B | Send | DIFFERENCE buff |
|---|---|---|---|---|---|---|
| 1 | 120 | 140 | 1024 | 1024 | 1024 | NULL |

| INDX | So-A | So-B | Send-A | Send-B | Send | DIFFERENCE buff |
|---|---|---|---|---|---|---|
| 1 | 120 | 140 | 1280 | 1280 | 1280 | NULL |

| INDX | So-A | So-B | Send-A | Send-B | Send | DIFFERENCE buff |
|---|---|---|---|---|---|---|
| 1 | 120 | 140 | 1024 | 1024 | 1024 | NULL |

| INDX | So-A | So-B | Send-A | Send-B | Send | DIFFERENCE buff |
|---|---|---|---|---|---|---|
| 1 | 120 | 140 | 1280 | 1152 | 1280 | POINTER |

| INDX | So-A | So-B | Send-A | Send-B | Send | DIFFERENCE buff |
|---|---|---|---|---|---|---|
| 1 | 120 | 140 | 1024 | 512 | 1024 | NULL |

| INDX | So-A | So-B | Recv-A | Recv-B | Recv |
|---|---|---|---|---|---|
| 1 | 120 | 140 | 896 | 1024 | 1024 |

FIG. 26A  THE A LINE RECEIVING COUNTER AND THE B LINE RECEIVING COUNTER ARE COMPARED WITH THE RECEIVING COUNTER TO DETERMINE THE DIFFERENCE

| INDX | So-A | So-B | Recv-A | Recv-B | Recv |
|---|---|---|---|---|---|
| 1 | 120 | 140 | 1280 | 1024 | 1280 |

| INDX | So-A | So-B | Recv-A | Recv-B | Recv |
|---|---|---|---|---|---|
| 1 | 120 | 140 | 1280 | 1280 | 1280 |

WHEN BOTH SYSTEMS ARE NORMAL:

| INDEX | STATE | type | So-A | So-B | IP-A | IP-B | S-Port | D-Port | Send-A | Send-B | Send |
|---|---|---|---|---|---|---|---|---|---|---|---|
| 1 | 1 | 0 | 130 | 140 | 03h | 83h | 1400 | 1000 | 66000 | 51000 | 66000 |

| Recv-A | Recv-B | Recv | DIFFERENCE buff POINTER |
|---|---|---|---|
| 66000 | 51000 | 66000 | |

WHEN ONE IS CUT OFF:

| INDEX | STATE | type | So-A | So-B | IP-A | IP-B | S-Port | D-Port | Send-A | Send-B | Send |
|---|---|---|---|---|---|---|---|---|---|---|---|
| 1 | 1 | 0 | 130 | -1 | 03h | -1 | 1400 | 1000 | 66000 | -1 | 66000 |

| Recv-A | Recv-B | Recv | DIFFERENCE buff |
|---|---|---|---|
| 66000 | -1 | 66000 | NULL |

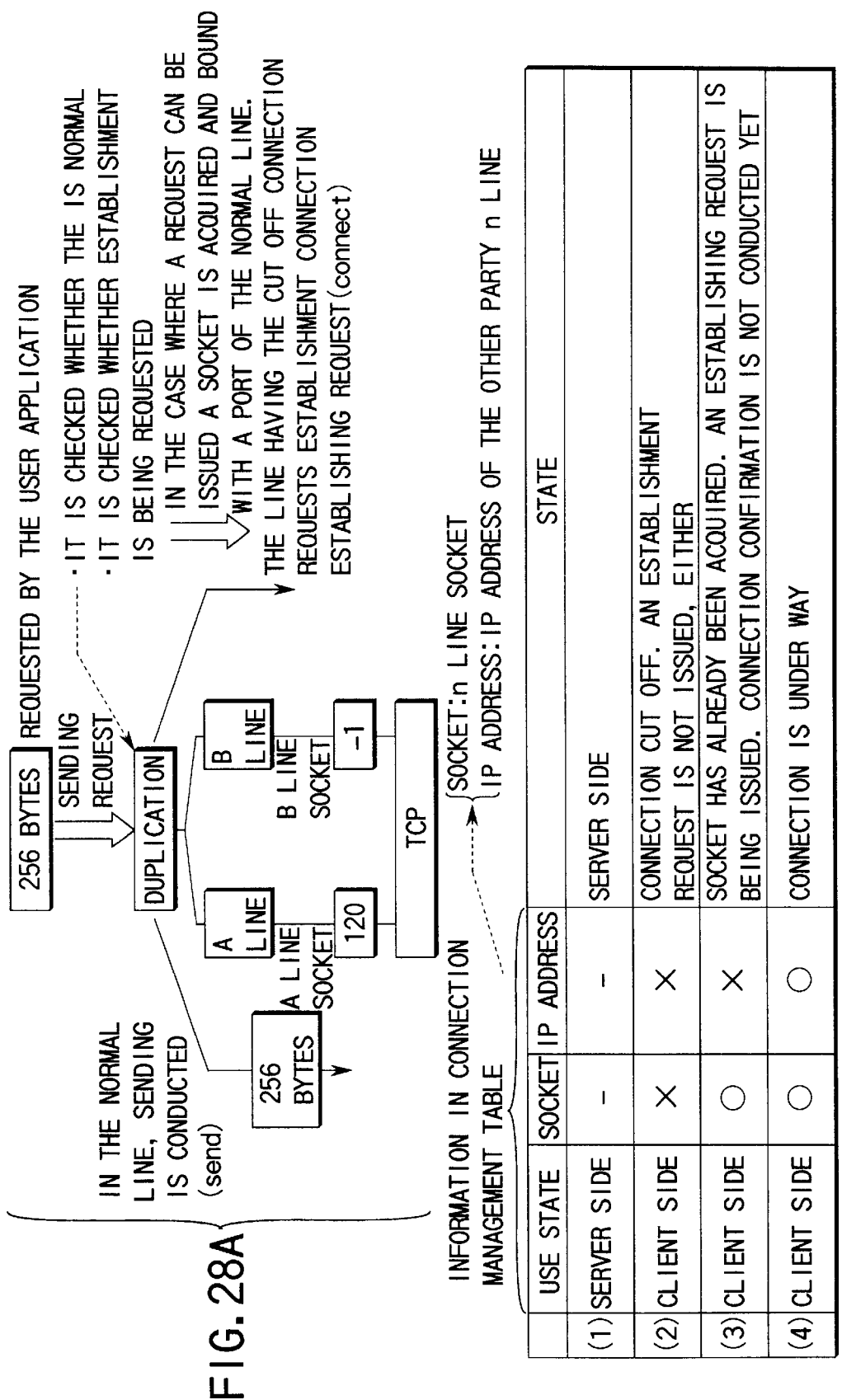

| INDX | STATE | type | So-A | So-B | IP-A | IP-B | Send-A | Send-B | Send |
|------|-------|------|------|------|------|------|--------|--------|------|
| 3 | 1 | 0 | 120 | 140 | 03h | -1 | 1280 | -1 | 1280 |

AFTER CONNECTION ESTABLISHMENT

| INDX | STATE | type | So-A | So-B | IP-A | IP-B | Send-A | Send-B | Send |
|------|-------|------|------|------|------|------|--------|--------|------|
| 3 | 1 | 0 | 120 | 140 | 03h | 83h | 1280 | 1280 | 1280 |

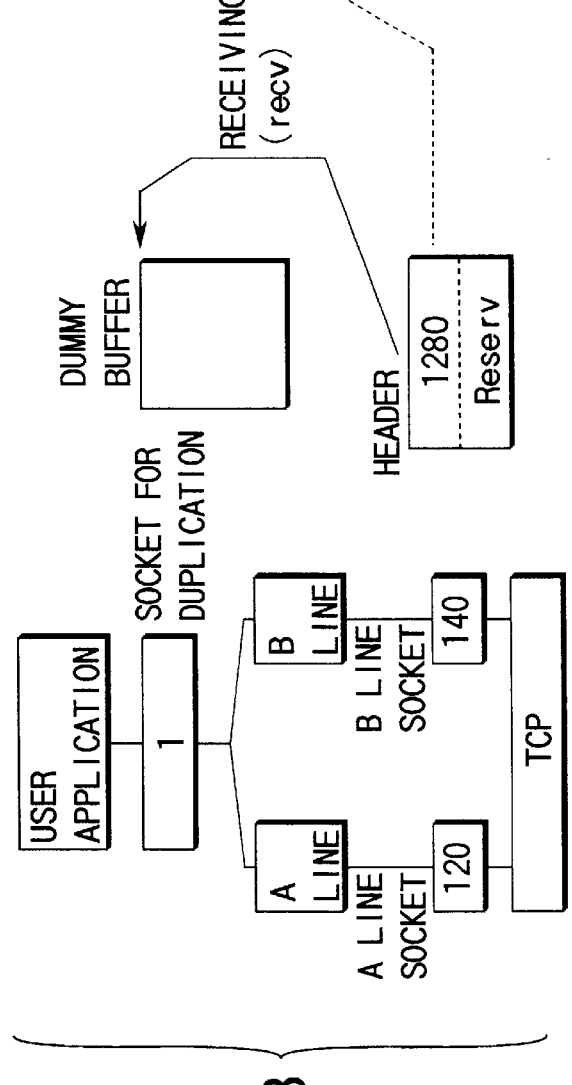

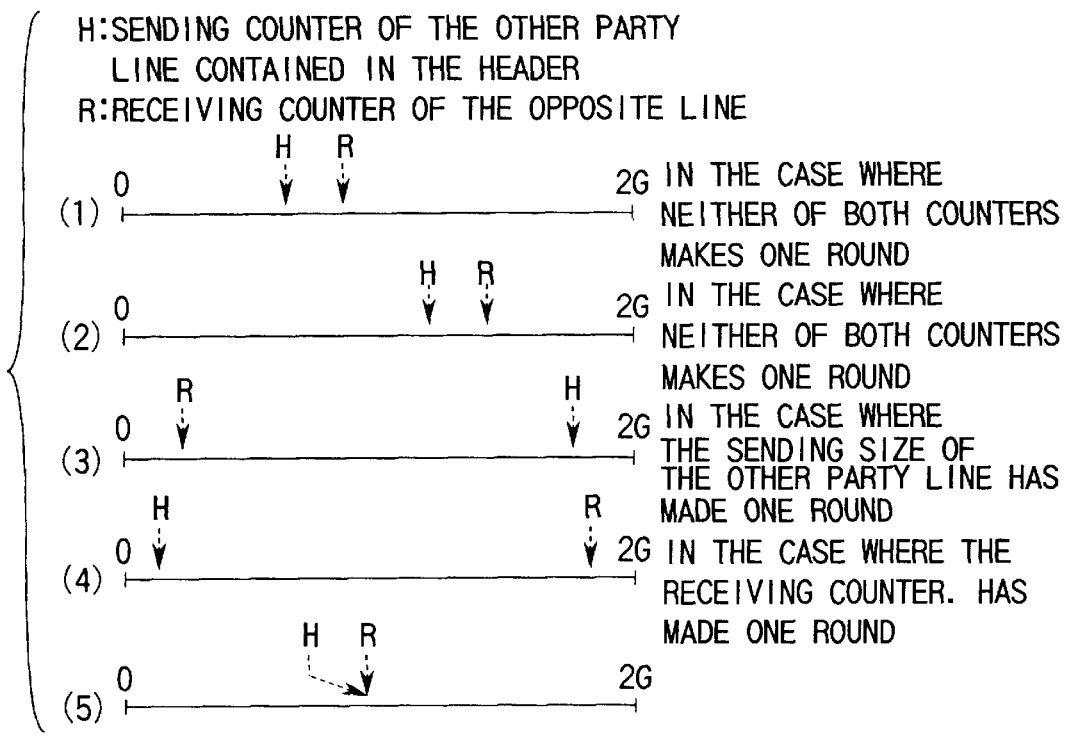

FIG. 33A

| | DIFFERENCE | H | R | DECISION |
|---|---|---|---|---|
| (1) | SMALL | SMALL | LARGE | WAITING SHOULD BE CANCELED. ALREADY, MORE DATA HAVE BEEN RECEIVED BY (RECEIVE-HEADER) SIZE |
| (2) | SMALL | LARGE | SMALL | WAITING SHOULD BE CONTINUED. WAITING IS KEPT UNTIL DATA CORRESPONDING TO (HEADER-RECEIVE) SIZE ARE RECEIVED |
| (3) | LARGE | SMALL | LARGE | WAITING SHOULD BE CONTINUED. WAITING IS KEPT UNTIL DATA CORRESPONDING TO (2G-(RECEIVE-HEADER)) SIZE ARE RECEIVED |
| (4) | LARGE | LARGE | SMALL | WAITING SHOULD CANCELED. ALREADY, MORE DATA HAVE BEEN RECEIVED BY (2G-(HEADER-RECEIVE)) SIZE |
| (5) | NULL | – | – | WAITING SHOULD BE CANCELED |

DESCRIPTION OF ABBREVIATIONS

DIFFERENCE: DIFFERENCE IN VALUE BETWEEN BOTH COUNTERS

R: RECEIVING COUNTER OF THE OPPOSITE LINE

RECEIVE: RECEIVING COUNTER OF THE OPPOSITE LINE

H: SENDING SIZE OF THE OTHER PARTY LINE CONTAINED IN THE HEADER

HEADER: SENDING SIZE OF THE OTHER PARTY LINE CONTAINED IN THE HEADER

2G: 2 GIGA-BYTES

FIG. 33B

TRANSMISSION LINE DUPLEXING PROCESSING METHOD AND APPARATUS THEREOF, AND RECORDING MEDIUM FOR RECORDING ITS PROCESSING PROCEDURE

BACKGROUND OF THE INVENTION

The present invention relates to a transmission line duplexing processing method, and apparatus, capable of transmitting data in layers higher than the TCP (Transmission Control Protocol) protocol by using a socket interface library and capable of easily operating in a workstation or the like, and relates to a recording medium for recording its processing procedure.

FIG. 1 shows an example of a configuration that signals can be sent and received between a plurality of personal computers via duplex transmission line (Ethernet). In FIG. 1, three personal computers PC1, PC2 and PC3 are interconnected via duplex transmission line, that is, an A transmission line (hereafter also referred to in some cases simply as A-line) BA and a B transmission line (hereafter also referred to in some cases simply as B-line) BB. Each the personal computers include software storage units S1, S2 and S3, device drivers D1, D2 and D3, and I/O units such as Ethernet card insertion units E1, E2, E3, E4, E5 and E6 for storing communication protocols.

FIG. 2 is a flowchart of data to be sent and received for explaining an example of a conventional transmission duplexing method. FIG. 2 shows the configuration of software corresponding to the hardware configuration of FIG. 1. In FIG. 2, there are shown applications 11 and 12 respectively stored in the software storage units S1 and S2 respectively of the personal computers P1 and PC2 shown in FIG. 1, duplexing processing units 21 and 22 respectively stored in the device drivers D1 and D2, TCP protocols 31 and 32 respectively stored in the Ethernet card insertion units E1 and E2, and E3 and E4, and Is protocols 41 and 42 stored in the Ethernet card insertion units E1 and E2, and E3 and E4.

The TCP protocols 31 and 32 are one method of establishing connections (both lines of the duplex transmission line) beforehand, and transmitting data by using the connections. In this case, the transmission data is not a block unit train, but a stream unit train.

Here, the "block unit train" means a cluster of transmission data in communication, and indicates data having a plurality of units each including, besides information data, transmission control characters. In the "stream unit train," a large amount of data are handled simply as a bit train instead of clusters such as blocks or packets. Thus the "stream unit train" means data formed of a plurality of byte units.

In the case the duplexing processing is performed by the duplexing processing units 21 and 22 in the above described configuration by using the TCP protocols 31 and 32, a connection is established through one of the transmission lines (such as BA). In the case where an abnormality has occurred on this transmission line BA, connection of the transmission line BB of the opposition line is established and the transmission is continued.

Even in the case where an abnormality is occurred on the transmission line BA, the TCP protocols 31 and 32 retries the sending. The user of the TCP protocols 31 and 32 cannot know up to which portion of the transmission data that the TCP protocols 31 and 32 are requested to send have been sent and which portion is being subjected to retry processing, because the TCP protocols 31 and 32 handle data (1), (2) and (3) of a stream unit train.

When one terminal device PC1 sends data toward the other terminal device PC2 in the order of (1), (2) and (3), the terminal device PC2 receives the data in the order of (1), (2) and (3), if the transmission line BA is normal.

However, if an abnormality has occurred on the transmission line BA during the transmission of, for example, (2), the transmission line is switched to the transmission line BB. Although the data is sent in the order of (1), (2) and (3), the terminal device PC2 cannot normally receive (2) among the received data. This results in received data lacking data, such as (1) and (3).

For transmitting data normally even in the case where an abnormality has occurred in one of the transmission lines, therefore, it is necessary to wait for the termination of the retry processing conducted by the TCP protocol, suspend the use of the one transmission line, then establish a connection using another transmission line, and perform transmission again. Since the retry time of the TCP protocol is typically in the range of 5 to 6 minutes, the switching to another transmission line cannot be effected. Over that time, therefore, the transmission is stopped.

BRIEF SUMMARY OF THE INVENTION

An object of the present invention is to provide a transmission duplexing method and apparatus capable of continuing transmission without stopping even in the case where an abnormality has occurred on one of duplexed transmission lines, and a recording medium for recording its processing procedure.

A transmission line duplexing processing method according to the present invention comprises the steps of: installing duplex transmission line between a plurality of terminal devices, the duplex transmission line being duplicated by first and second transmission lines; making it possible to send and receive data of a stream unit train between the terminal devices by using a TCP protocol; sending the data of the stream unit train simultaneously to the transmission lines; receiving data, and handling only data which is included in the data sent at the sending step and which has arrived earlier, as received data; detecting an abnormality caused on either of the first and second transmission lines; and responding to detection of occurrence of the abnormality on the transmission line conducted at the abnormality detecting step, to close the transmission line having the abnormality and conduct sending and receiving by using a remaining normal transmission line.

Preferred manners for carrying out the present invention are as follows.

(1) The step of responding to detection of occurrence of an abnormality on a transmission line conducted at the abnormality detecting step, to store the data obtained immediately before the occurrence of the abnormality is further provided.

(2) The receiving step comprises the step of measuring receiving data size for each of the transmission lines when receiving data, deriving a difference between them, receiving only data of the difference, and receiving new data after disappearance of the difference.

(3) The abnormality detecting step comprises the step of measuring receiving data size for each of the transmission lines when sending data, deriving a difference between them, and judging the transmission line storing the difference to be abnormal when data of the difference has exceeded a prescribed value.

(4) The step of responding to detection of occurrence of an abnormality on a transmission line conducted at the abnormality detecting step and closing of the transmission line having the detected abnormality, to periodically request reestablishment of both of the transmission lines, and responding to restoration of the transmission line having the detected abnormality to a normal state and reestablishment of the closed transmission line, to conduct sending and receiving by using both of the transmission lines again is further provided.

With above configuration, the transmission can be continued without stopping even in the case where an abnormality has occurred in one of the duplexed transmission lines.

(5) The step of receiving head data when the closed transmission line has been reestablished, preventing the reestablished transmission line from being used until receiving data corresponding to the receiving size contained in receiving unit of a normal transmission line, and using reestablished both transmission lines only when an opposite line has received data corresponding to the receiving size contained in the header is further provided.

The order of the stream data is not disturbed, in addition to the above described advantage.

The present invention can be realized not only as a transmission line duplexing processing method, but also as an apparatus for realizing the method, or a computer-readable recording medium for recording its processing procedure.

As described above, according to the present invention, in a transmission line duplexing processing method, and apparatus, and a recording medium for recording the processing procedure, the transmission a can be continued without stopping, even in the case where an abnormality has occurred in one of the transmission lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5B are diagrams showing the data structure of management information used according to an embodiment of the present invention;

FIGS. 6A and 6B are diagrams for explaining the meaning of terms of FIG. 5;

FIG. 7 is a diagram for explaining a sending difference buffer of FIG. 5;

FIG. 8 is a diagram for explaining abbreviated words used in a connection management table of FIG. 5;

FIG. 10 is a diagram for explaining the naming processing to socket according to an embodiment of the present invention;

FIG. 16 is a diagram for explaining a flow of connection establishment and states thereof according to an embodiment of the present invention;

FIGS. 26A to 26D are diagrams for explaining the receiving processing according to an embodiment of the present invention;

FIGS. 28A and 28B are diagrams for explaining the processing for cutting off one line of a connection according to an embodiment of the present invention;

FIGS. 30A and 30B are diagrams for explaining the processing conducted after establishment of a connection according to an embodiment of the present invention;

FIGS. 33A and 33B are diagrams for explaining the processing conducted after establishment of a connection according to an embodiment of the present invention.

DETAILED DESCRIPTION OF THE INVENTION

Hereafter, embodiments of the present invention will be described in reference to the drawings.

Figure 3:
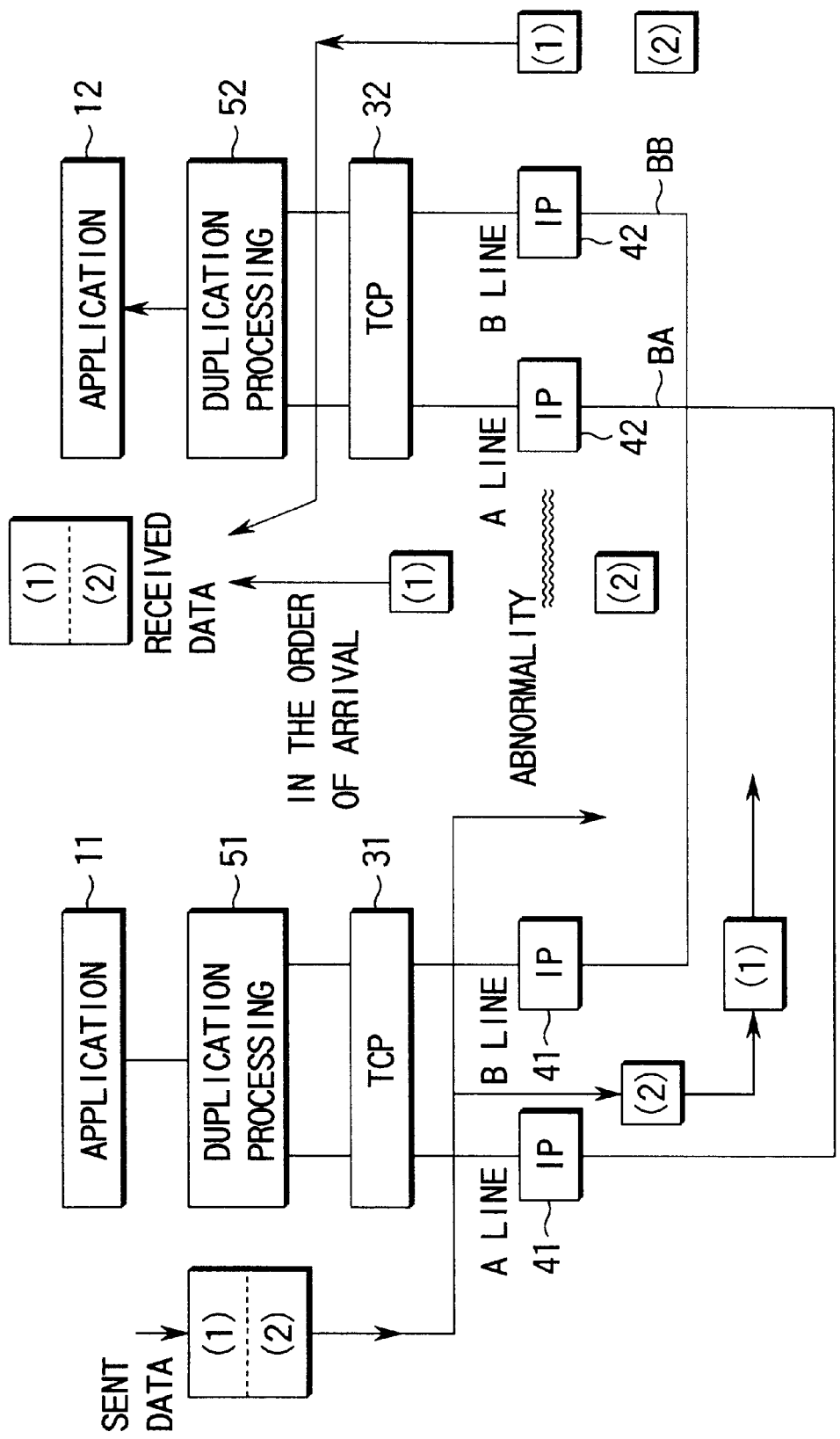
FIG. 3 is a diagram for explaining a signal flow of a transmission line duplexing processing method according to the present invention.

FIG. 3 is a flowchart for explaining an embodiment of a transmission line duplexing processing method according to the present invention. FIG. 3 shows the configuration of software corresponding to the hardware configuration of FIG. 1. In FIG. 3, there are shown applications 11 and 12 respectively stored in the software storage units S1 and S2 respectively of the personal computers PC1 and PC2 shown in FIG. 1, duplexing processing units 51 and 52 respectively stored in the device drivers D1 and D2, TCP protocols FIG. 31 and 32 respectively stored in the Ethernet card insertion units E1 and E2, and E3 and E4, and IP protocols 41 and 42 stored in the Ethernet card insertion units E1 and E2, and E3 and E4.

The TCP protocols 41 and 42 are one method of establishing connections (both lines of the duplex transmission line) beforehand, and transmitting data by using the connections. In this case, the transmission data is not a block unit train, but a stream unit train.

The duplexing processing system according to the present embodiment includes socket creation processing Z1, socket naming processing Z2, connection acceptance permitting processing Z3, connection establishing processing Z4, sending processing Z5, receiving processing Z6, processing Z7 for cutting off one line of the connection, connection reestablishing processing Z8, and processing Z9 after connection establishment.

Hereafter, these processings will be described in detail.

The connection establishing processing Z8 is processing for establishing a connection so that each of the duplexed transmission lines BA and BB can always conduct transmission.

The sending processing Z5 is processing for sending on the sending side the same data to both duplexed transmission lines (both connections).

The receiving processing Z6 is processing for notifying on the receiving side the duplexing processing user (hereafter referred in some cases to as application or user application) of data in the order of arrival.

The processing Z7 for cutting off one line of the connection is processing, responsive to occurrence of an abnormality on one of the transmission lines in such a state that a connection has been established, to close (interrupt) the connection of the abnormal line, and conduct the sending and receiving by using the remained normal transmission line. The abnormal line subjected to the connection cut off requests the reestablishment of the connection periodically.

The processing Z9 after connection establishment is processing, responsive to restoration of the transmission line to the normal state, to conduct the sending and receiving by using both transmission lines again.

The processing of FIG. 4 will now be described. In the present invention, only the data which arrives earlier is received as effective data.

Figure 4:
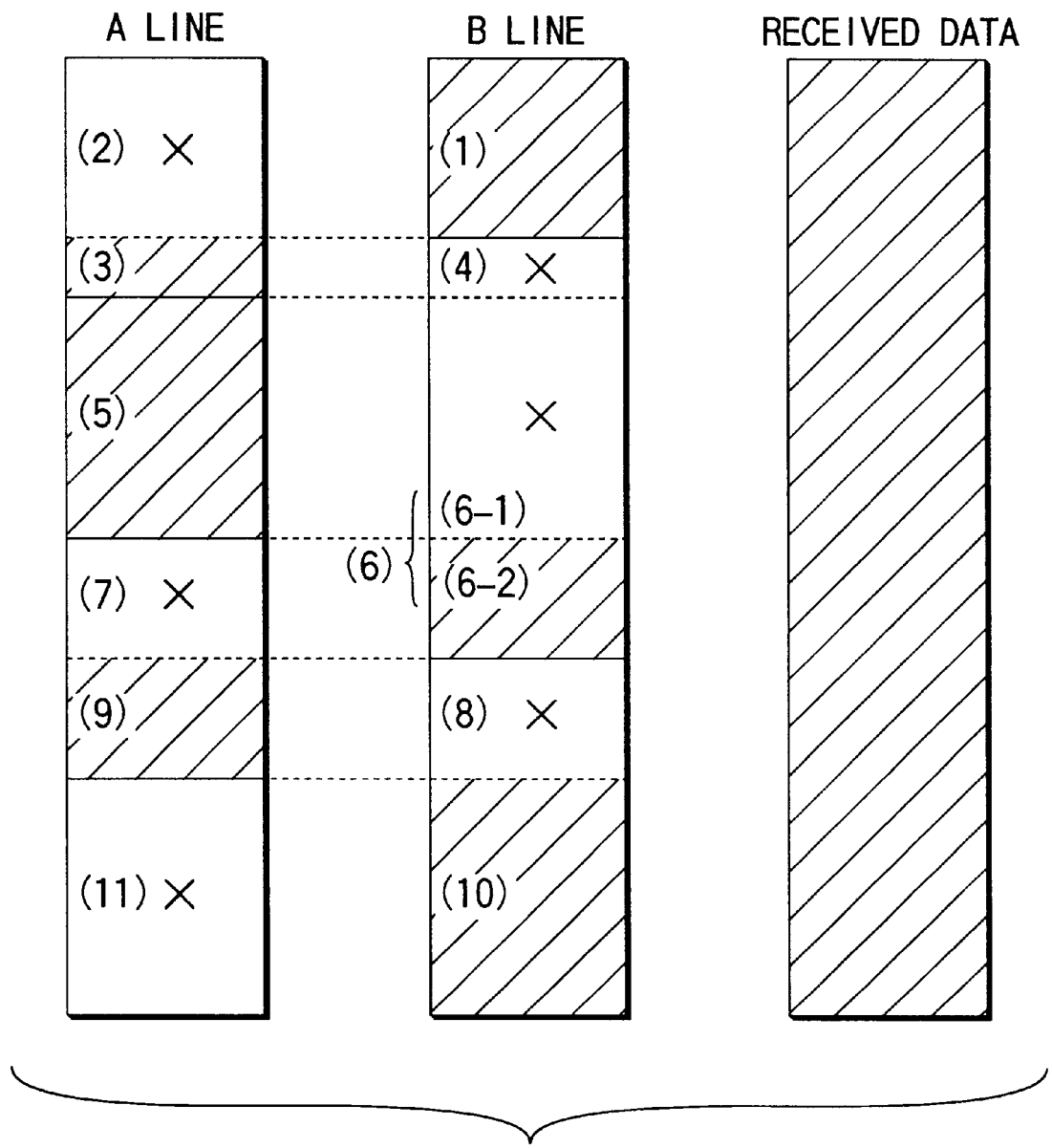
FIG. 4 is a diagram for explaining a function of an embodiment of the present invention.

As for the data (1) and (2) in data receiving of FIG. 4, the data (1) is handled as received data and the data (2) is discarded since the data (1) has arrived earlier. Data (3) and (4) or data (8) to (11) are also handled in the same way. For the case where the sending data size is different as shown in (5) to (7), processing is conducted as follows. In the case where data are received in the order of (5), (6) and (7), data (5) which arrived earlier is first handled as received data. If the received quantity of the data (6) is larger than the quantity of the data (5) when the data (7) is received, then data (6-1) corresponding to the quantity of the data (5) is discarded, and subsequent data (6-2) is handled as received data. In this way, received data having no missing portions is obtained.

In the configuration as described above, the same data is sent to both transmission lines as shown in FIG. 4. In both lines, therefore, it is not necessary to switch the system for sending and receiving. Furthermore, even if the A-line becomes abnormal after, for example, the data (1) has been received, the B-line can receive the same data as that of the A-line, and consequently it is possible to surely deliver the sent data supplied from the application to the destination. As shown in FIG. 4, therefore, the sent data can be received in a normal form by combining normal data delivered by either the A-line or the B-line.

FIG. 5A shows an example of a configuration of a connection management table for storing management information used in the duplexing processing.

FIG. 5B shows an example of a concrete configuration of the connection management table of FIG. 5A. This management table is used to control the duplexing of the connection, and stores illustrated contents. In the present configuration example, 256 nodes are shown.

Concrete contents of the management table shown in FIG. 5 are shown in FIG. 6.

In FIG. 6, there is an item describing that the range is the 31st power of 0 to 2 (2 GB) as an item common to a sending counter and a receiving counter, and there means only 31 bits are used in 32-bit data width.

FIG. 7 shows a sending difference buffer. The maximum size per connection is 1 mega-byte.

Figure 9:
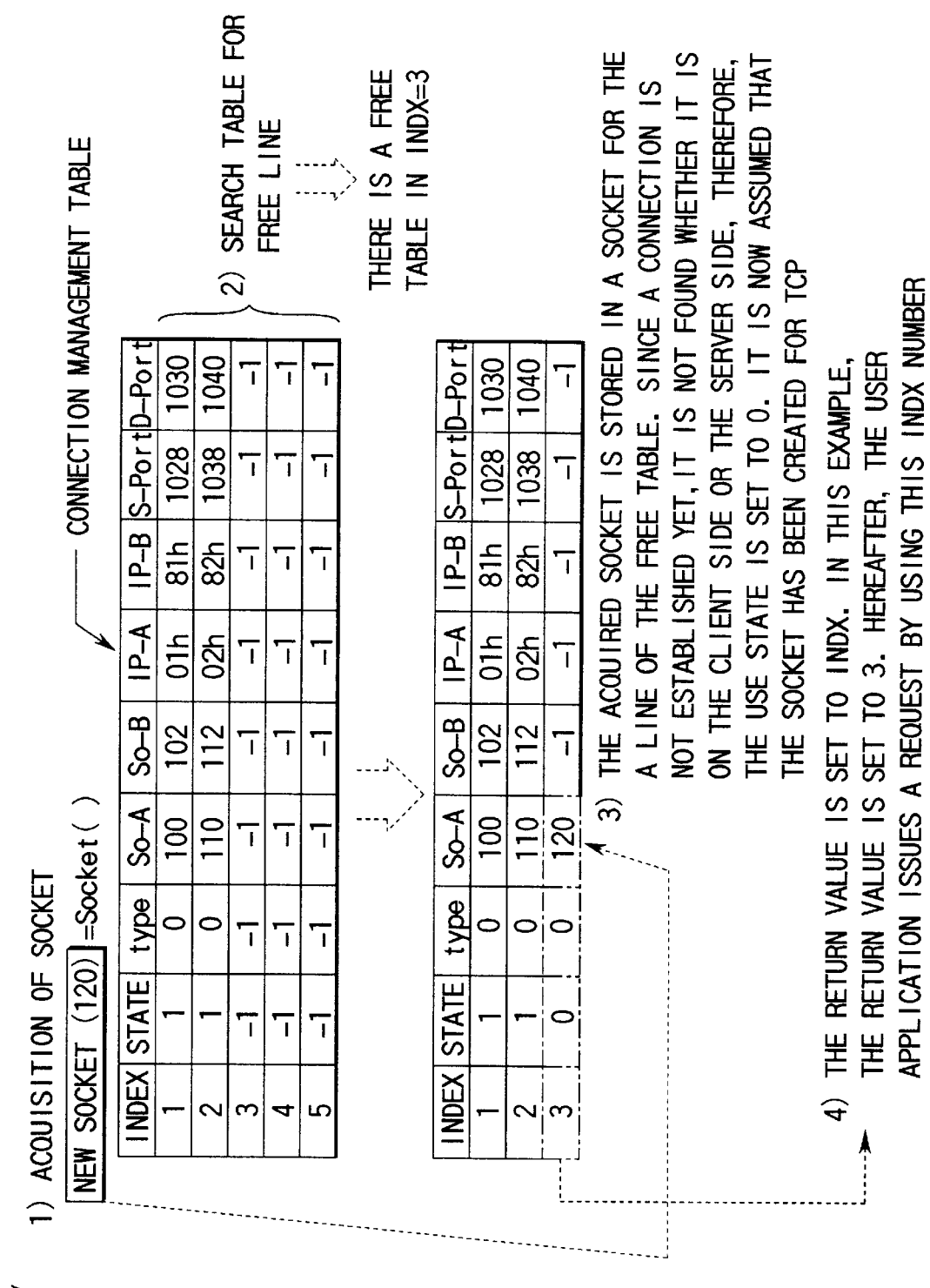
FIG. 9 is a diagram for explaining socket creation processing of an embodiment according to the present invention.

FIG. 9 is a diagram showing the outline of a procedure for realizing the duplexing processing on the basis of the connection management table. For description, the connection management tables shown in FIGS. 5A and 5B are used. As for the IP address, lower one byte is used for description.

<Socket Creation Processing Z1>

FIG. 9 is a diagram for explaining the processing ranging from socket creation to storing it into the connection management tables of FIGS. 5A and 5B. This processing includes creating one socket, searching for a free connection management table according to the following procedures 1) to 4), and setting information in the connection management table. A socket library to be used is a Socket function.

1) Acquisition of Socket

It is now assumed that a new socket (12)=Socket ( ).

2) Search for usable table Since the argument of the socket function is a null string, the connection management table is searched for a usable table. In this case, it has been found that there is a usable table of INDX=3 as a result of the search.

3) The acquired socket is stored in a socket for the A-line of the usable table (INDX=3). Since a connection is not established yet, it is not found whether it is on the client side or the server side. In this table, therefore, the use state is set to 0. It is assumed that the socket has been created for TCP.

4) The return value is set to INDX (In this example, the return value is set to 3). Hereafter, the user application issues a request by using this INDX number.

<Socket Naming Processing>

Figure 1:
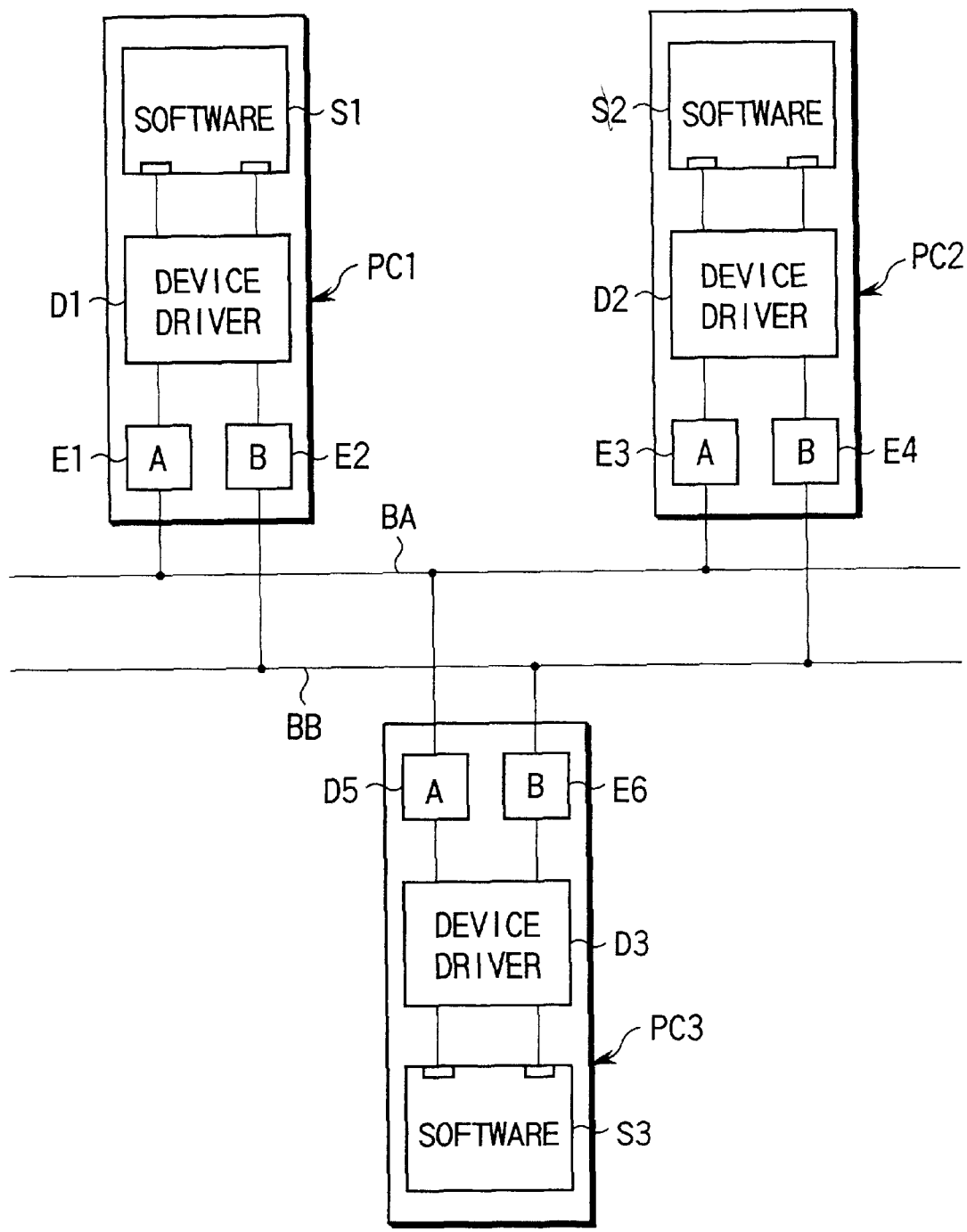
FIG. 1 is a diagram showing a hardware configuration of a transmission line duplexing processing method according to the present invention.
Figure 2:
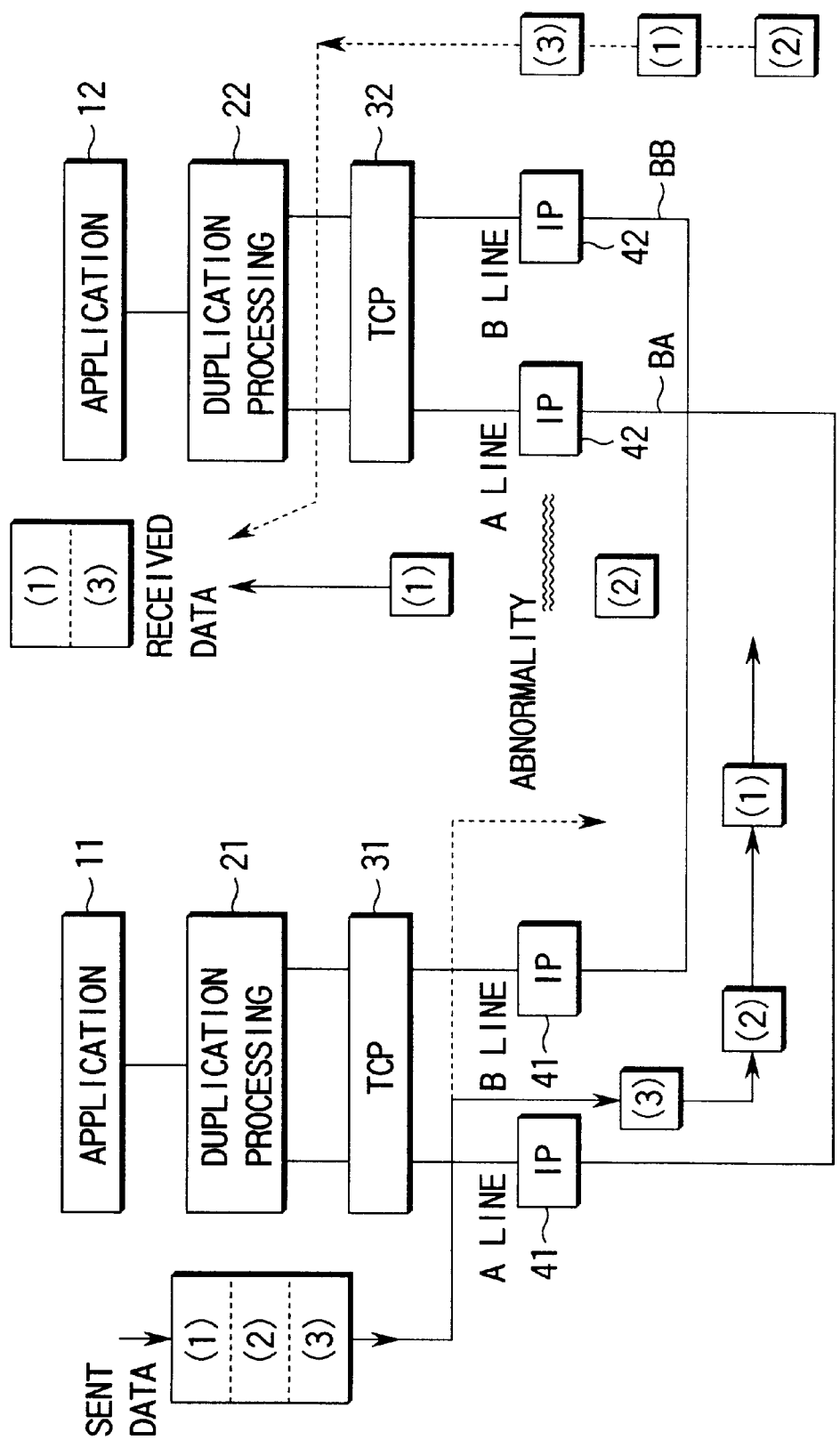
FIG. 2 is a diagram for explaining a signal flow of a conventional transmission line duplexing processing method.

FIG. 1 is a diagram for explaining the procedure of processing for naming a socket (bind processing). The present processing is conducted according to the following procedures 1) to 3).

The present processing is processing for binding a socket (for naming a socket) at a port number and an IP address specified by the user application. In this case, the socket library to be used is a bind function.

1) The socket specified by the user application is bound at a port number 1000 and an IP address 0.0.0.0. In the case of establishment of a passive connection, typically it is not known from which node a connection request is issued, and the binding is effected at the IP address 0.0.0.0.

At this time, the socket number specified by the application is an index number of the connection management table, and the socket number becomes 3.

2) The socket for the A-line is taken out, and is bound with the port number 1000 and the IP address 0.0.0.0. specified by the user application.

3) The bound port number and IP address are stored in the connection management table.

<Connection Acceptance Permitting Processing Z3>

Figure 11:
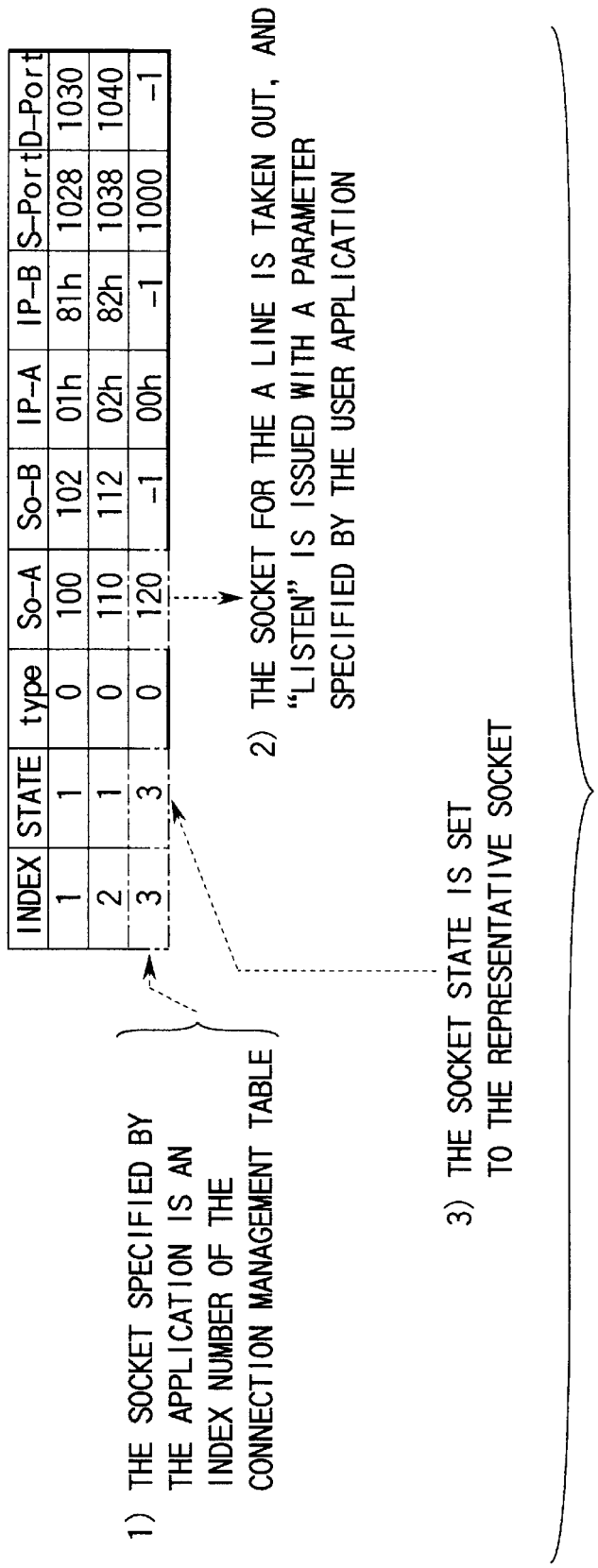
FIG. 11 is a diagram for explaining the flow of processing of permitting acceptance of a connection according to an embodiment of the present invention.

FIG. 11 is a diagram for explaining the flow of the connection acceptance permitting processing. The present processing is conducted according to the following procedures 1) to 3). This processing is processing for declaring that the socket specified by the user application is ready to accept a connection request from a remote place. In this case, the socket library to be used is a listen function. This processing is processing required when conducting a passive connection. After conducting this processing, the user application typically conducts passive connection processing. Therefore, the socket requested by the connection acceptance permission processing is used as a representative socket.

1) The socket number specified by the application is an index number of the connection management table in the same way as the above described binding processing.
2) The socket for the A-line is taken out, and "listen" is issued with a parameter specified by the user application.
3) The socket state specified by the application is set to the representative socket.

<Connection Establishment>

FIGS. 12 to 19 show the flow regarding to connection establishment request and the state of the connection management table. After the connection establishment, the processing after the connection establishment described later is conducted according to the procedures 1) to 8).

<Connection Establishing Processing Z4>

Figure 12:
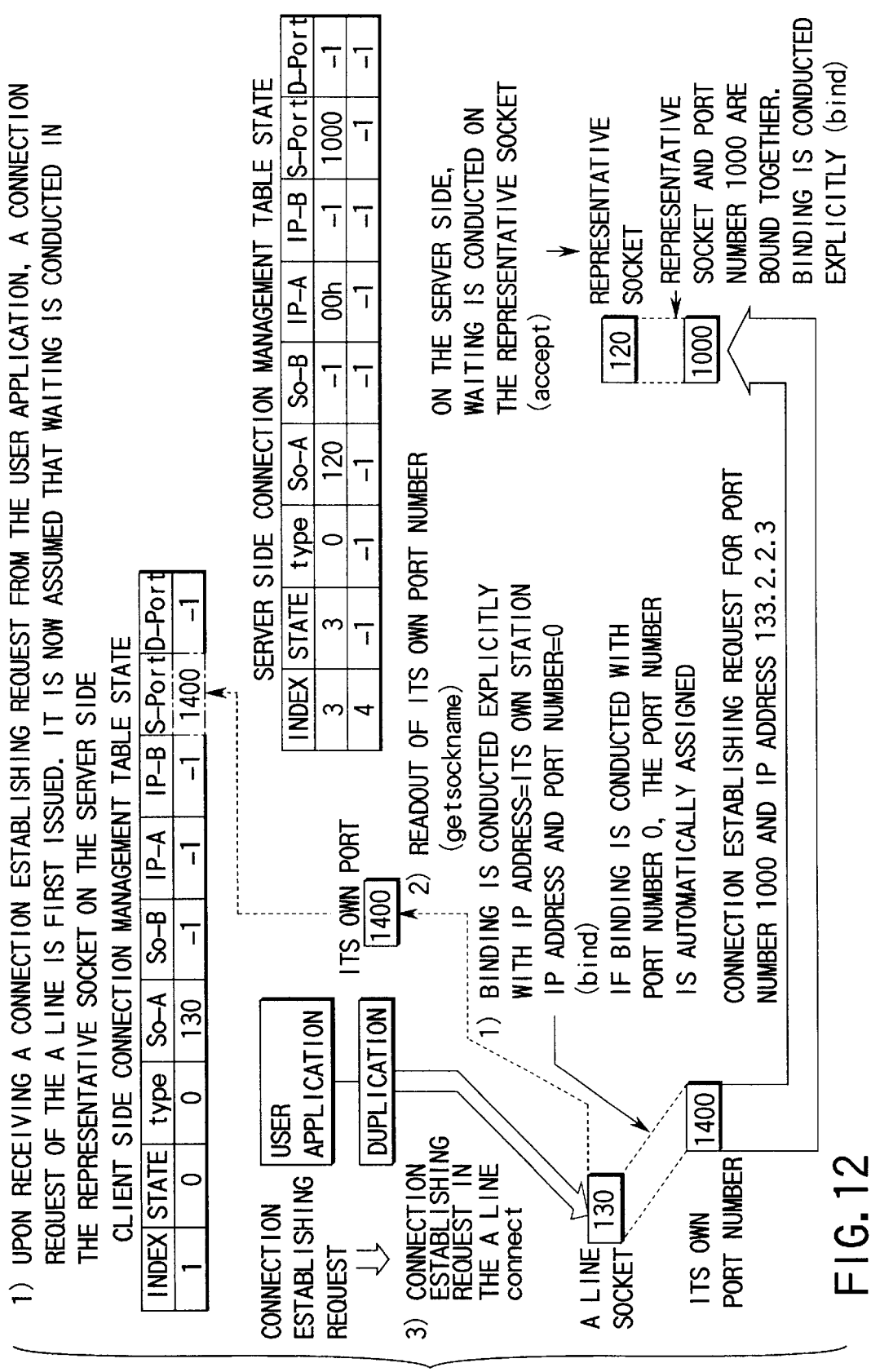
FIG. 12 is a diagram for explaining a flow of connection establishment and states thereof according to an embodiment of the present invention.

FIG. 12 is a diagram for explaining a request for establishing a connection of the A-line. The following procedure 1) is conducted.

1) Upon receiving a connection establishing request from the user application, a connection request of the A-line is first issued. It is now assumed that waiting is conducted in the representative socket on the server side.

Figure 13:
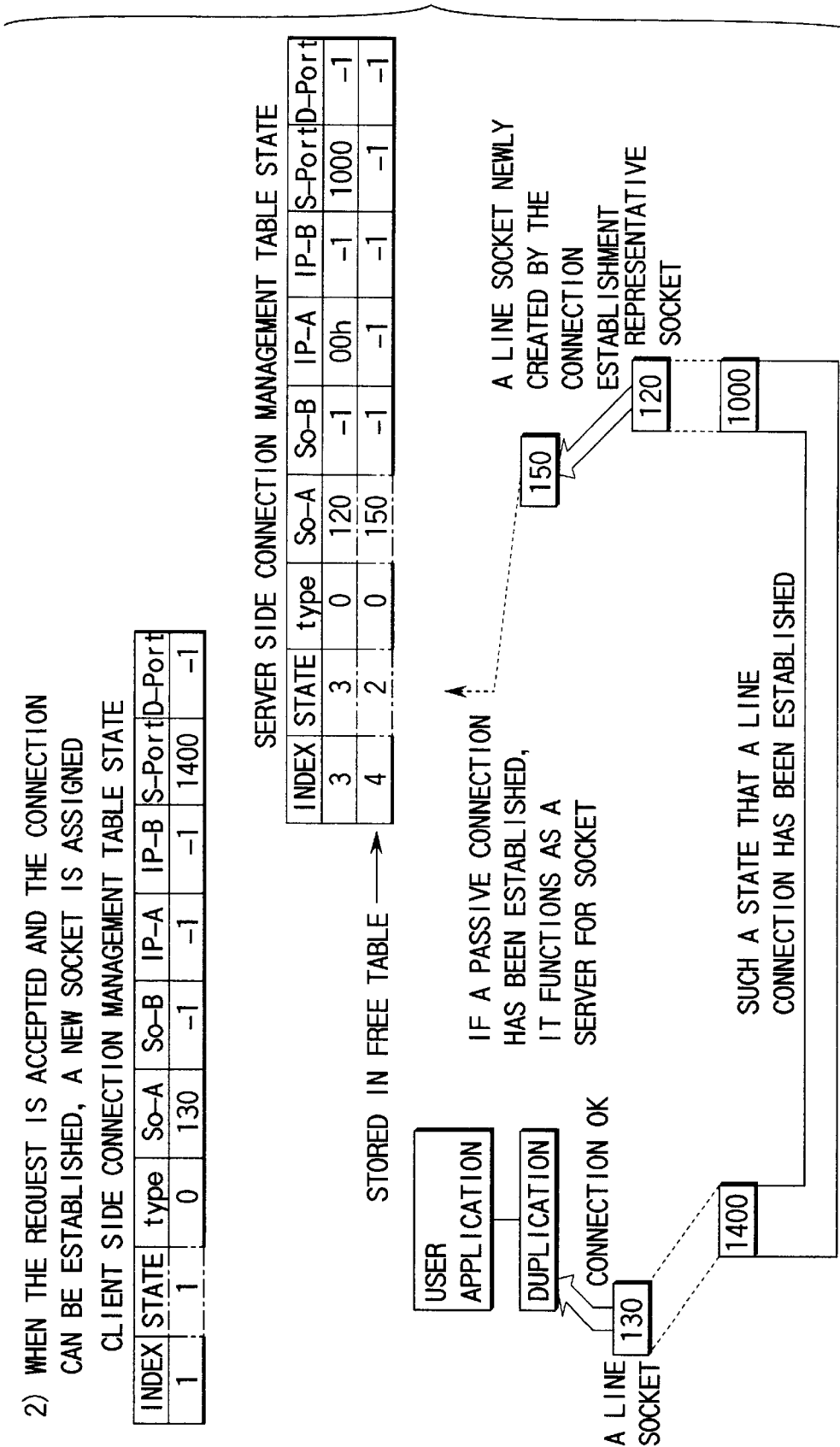
FIG. 13 is a diagram for explaining a flow of connection establishment and states thereof according to an embodiment of the present invention.

FIG. 13 is a diagram for explaining the establishment of the connection of the A-line. The following procedure 2) is conducted.

2) When the request is accepted on the server side and a connection is established, a new socket is assigned.

Figure 14:
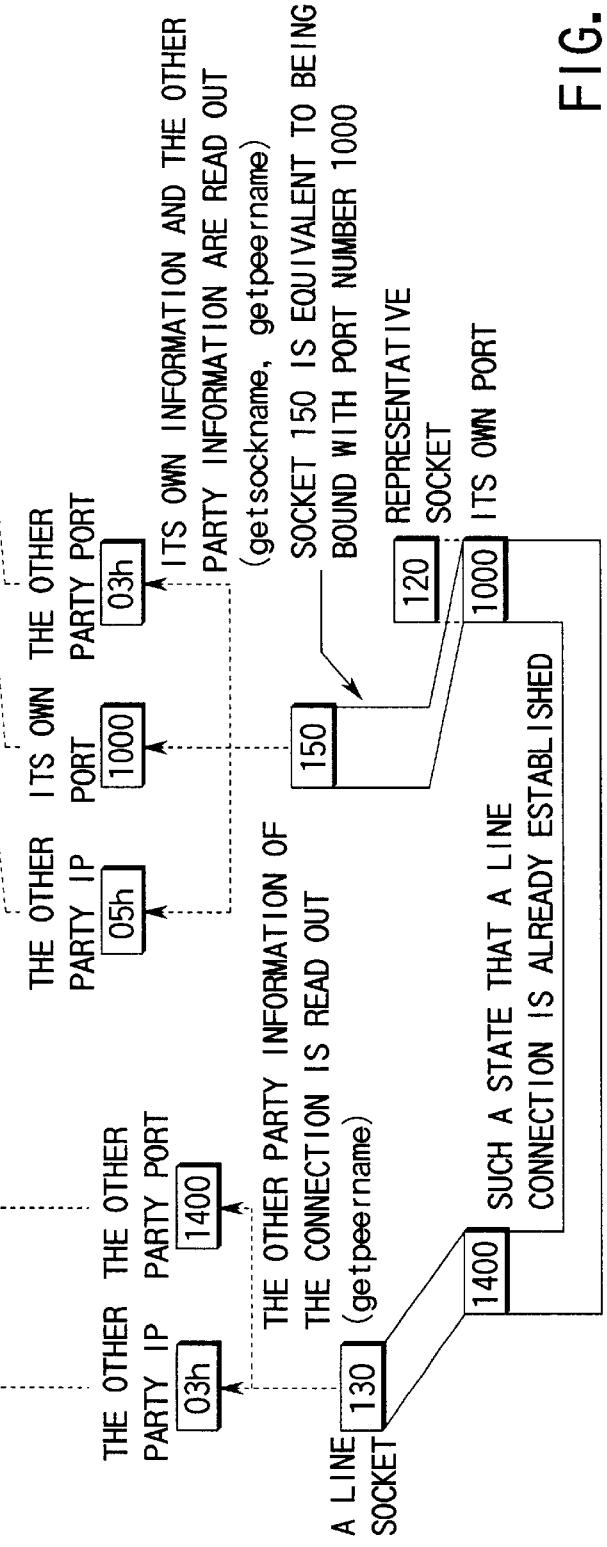
FIG. 14 is a diagram for explaining a flow of connection establishment and states thereof according to an embodiment of the present invention.

FIG. 14 is a diagram for explaining readout of the information of the connection of the A-line. The following procedure 3) is conducted.

3) If the connection has been established, the IP address of the other party, its own port number, and the port number of the other party are read out and stored in the connection management table.

Figure 15:
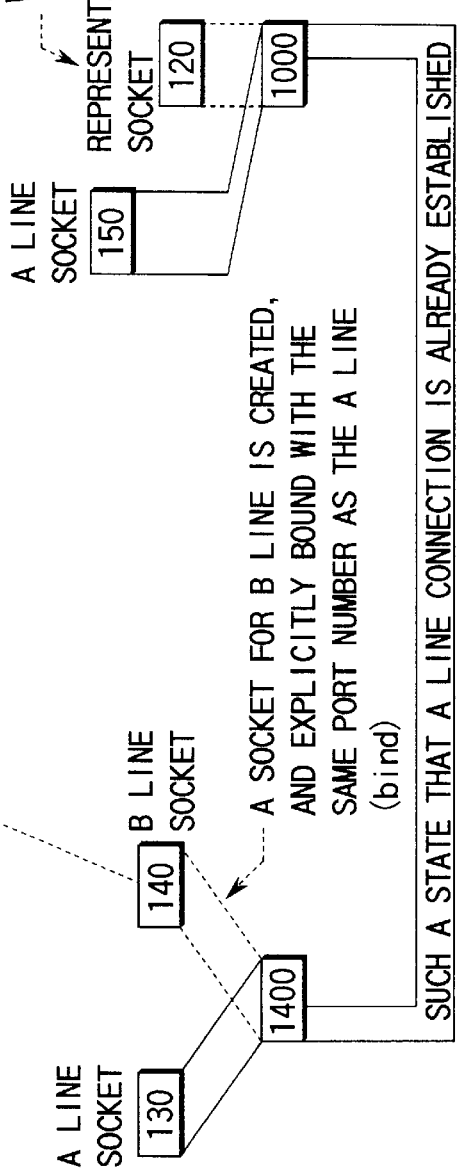
FIG. 15 is a diagram for explaining a flow of connection establishment and states thereof according to an embodiment of the present invention.

FIG. 15 is a diagram for explaining creation of a socket of the B-line. The following procedure 4) is conducted.

4) In order to establish the connection of the B-line, a socket for the B-line is created and bound with the port number of the A-line, on the client side.

FIG. 16 is a diagram for explaining an establishment request of the connection of the B-line. The following procedure 5) is conducted.

5) An establishment request of the connection of the B-line is conducted. In the same way as the A-line, a request is made to the representative socket. The IP address of the B-line is set to the address of the A-line+80 h.

Figure 17:
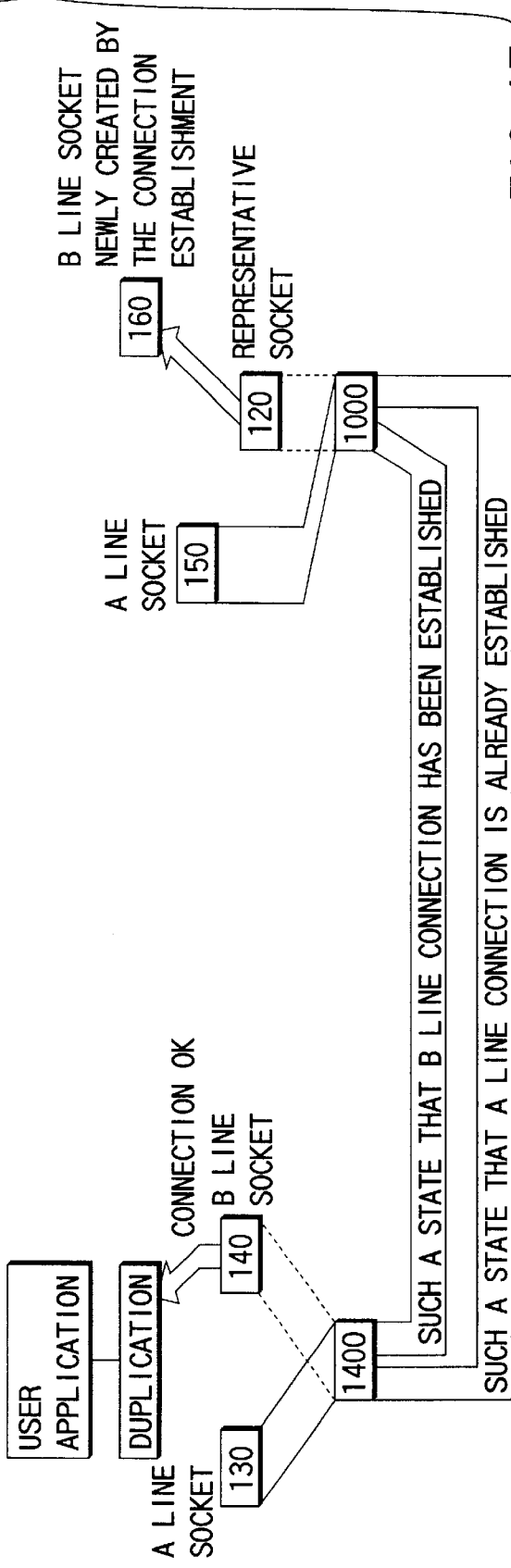
FIG. 17 is a diagram for explaining a flow of connection establishment and states thereof according to an embodiment of the present invention.

FIG. 17 is a diagram for explaining the establishment request of the connection of the B-line. The following procedure 6) is conducted.

6) When the request is accepted on the server side and a connection is established, a new socket is assigned.

Figure 18:
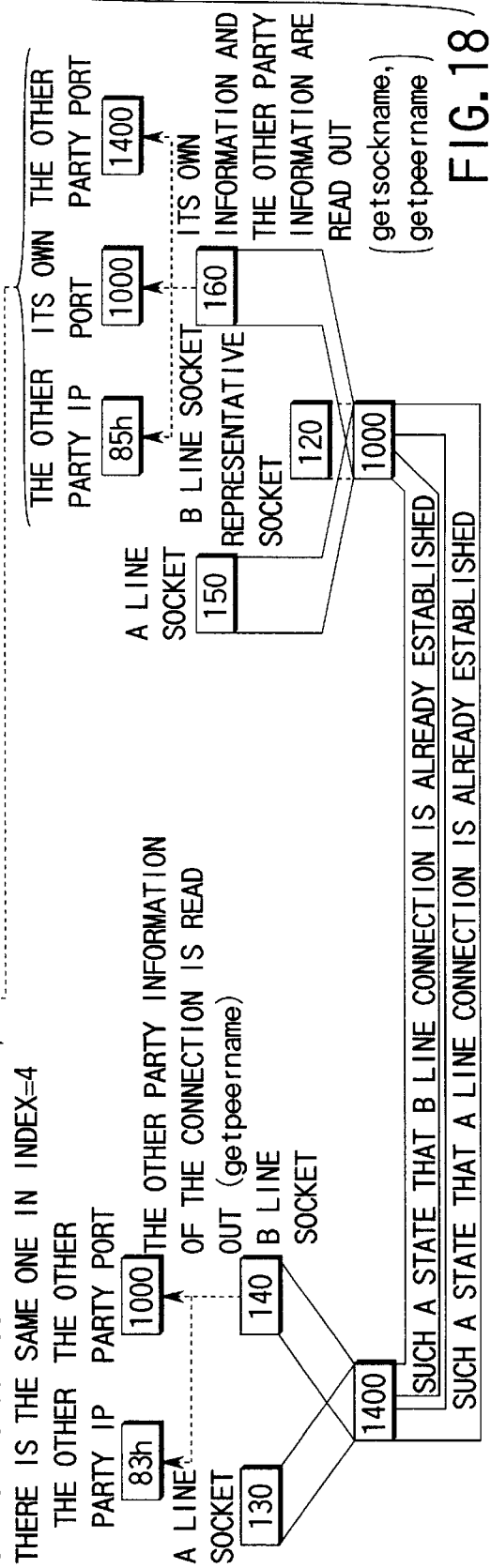
FIG. 18 is a diagram for explaining a flow of connection establishment and states thereof according to an embodiment of the present invention.

FIG. 18 is a diagram for explaining to read the connection information of the B-line. The following procedure 7) is conducted.

7) If the connection has been established, the IP address of the other party, its own port number, and the port number of the other party are read out. On the server side, the connection management table is searched by using the IP address of the other party and the port number of the other party, and it is checked whether there is a pair of sockets.

Figure 19:
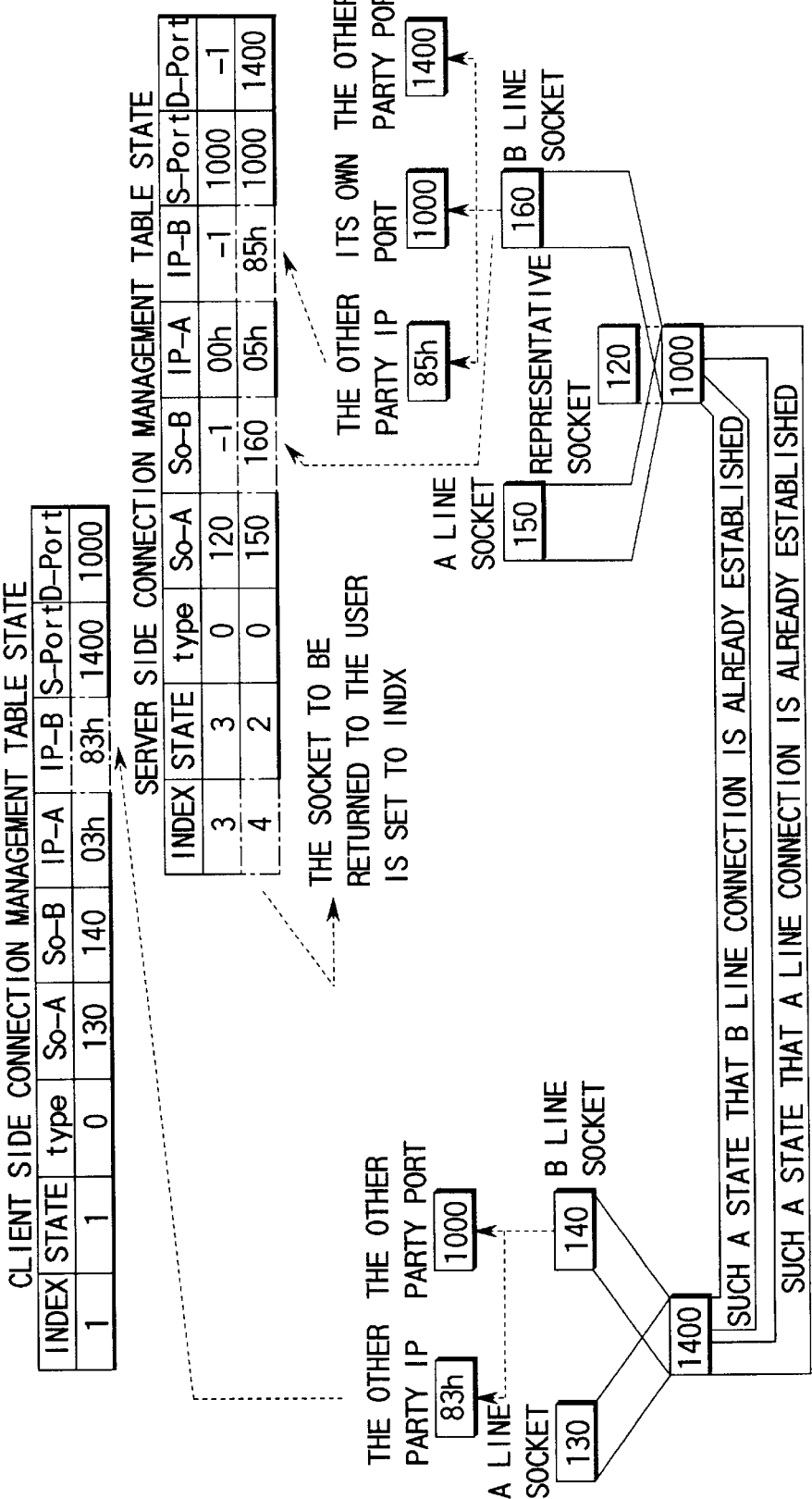
FIG. 19 is a diagram for explaining a flow of connection establishment and states thereof according to an embodiment of the present invention.

FIG. 19 is a diagram for explaining to store the connection information of the B-line. The following procedure 8) is conducted.

8) The IP address of the other party, its own port number, and the port number of the other party which have been read out are stored in the connection management table. If there is no pair as a result of searching a pair on the server side, new registration is conducted. If there is a pair, addition thereto is effected.

<Sending Processing (TCP) Z5>

An outline of sending processing (TCP), that is, sending processing of stream type (TCP) socket (procedure 11) to 16)) will now be described.

11) If there is difference data at the time of a sending request, it is first sent.
12) In the sending processing, the same data is sent out to the A-line and the B-line. If the sending has been finished normally, the size successfully sent this time is added to an A-line sending counter and a B-line sending counter of the connection management table of FIG. 15. At the same time, a larger value out of the values of the A-line sending counter and the B-line sending counter is stored in a sending counter.
13) Although the size accepted by the TCP is returned to the user application, the larger one of the sizes successfully sent by the systems this time is returned.
14) If the sizes accepted by the TCP are different as a result of sending to both lines, the line having a smaller size copies the difference between a larger size of the other line and its own smaller size to a sending difference storing buffer of the connection management table. This difference is referred to as "sending difference data."

15) In the case where the sending difference data has exceeded 1 mega-bytes, the connection of the system having less sending data is closed (cut off).
16) As for the timing of sending data stored in the sending difference storing buffer, the data are sent at the time of next sending, or when a system waiting for multiplexing described later and having a difference is permitted to write in (permitted to send).

At the time of the sending request, the processing changes depending upon whether there is the difference E1 data as described above. The processing in the case where there is difference data and the processing in the case where there is not the difference data will now be described concretely in reference to FIGS. 20A to 24.

Figures 20A, 20B, 20C:
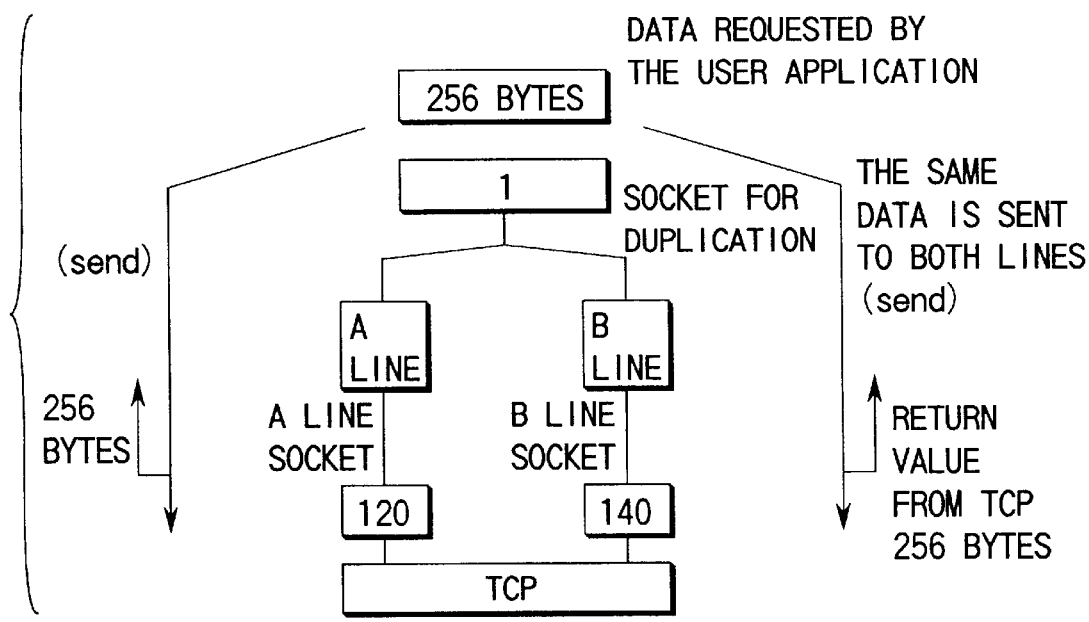
FIGS. 20A to 20C are diagrams for explaining the sending processing according to an embodiment of the present invention.

FIGS. 20A to 20C are diagrams for explaining processing 1 conducted in the case where there is no difference data at the time of a sending request.

FIG. 20A shows the connection management table at the time when there is no difference data (It regards that there is no difference data because three values of the A-line sending counter Send-A, the B-line sending counter Send-B, and the sending counter Send are equal to 1024 bytes.).

FIG. 20B is a diagram showing the data flow in the case where there has been a sending request of 256 bytes from the user application in the state of FIG. 20A. FIG. 20C shows the connection management table obtained after the sending. As compared with FIG. 20A, all of the values of the Send-A, Send-B, and Send have changed to 1280 bytes.

Figures 21A, 21B, 21C:
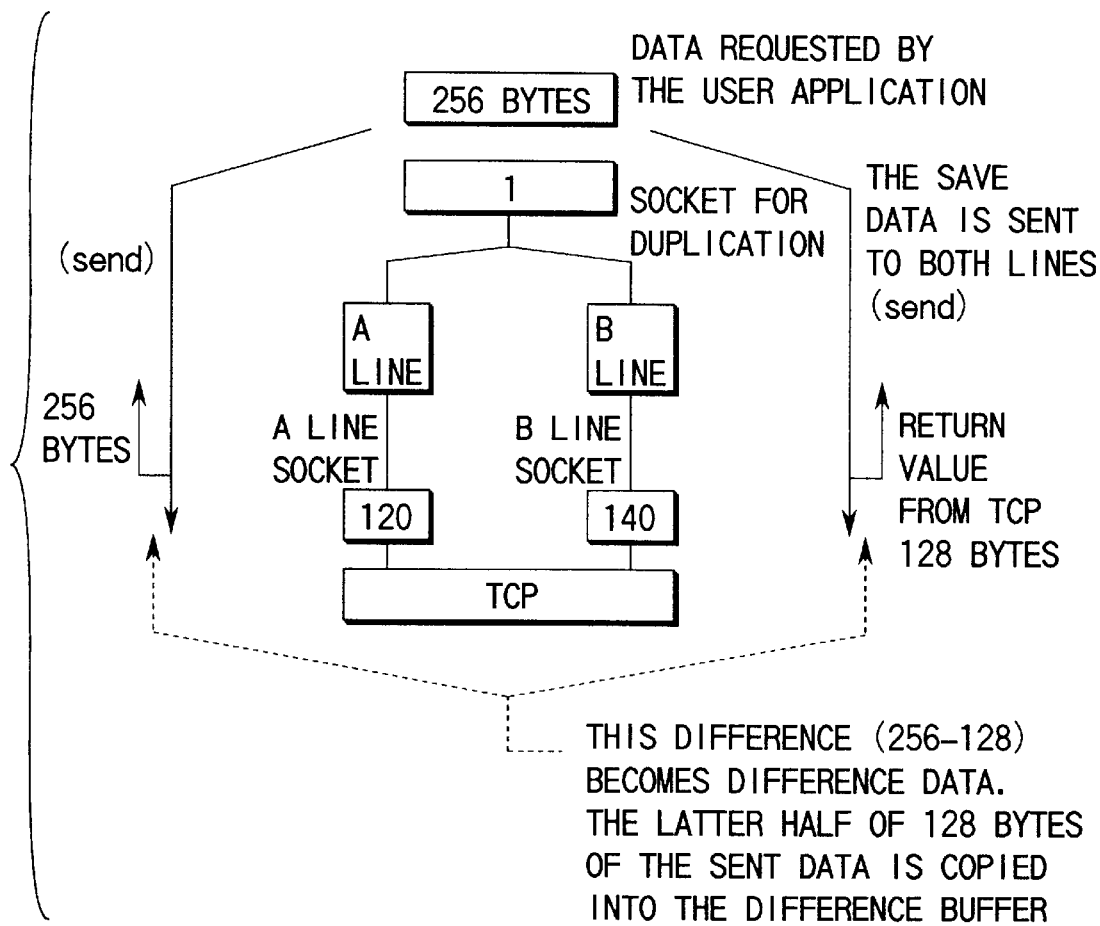
FIGS. 21A to 21C are diagrams for explaining the sending processing according to an embodiment of the present invention.

FIGS. 21A to 21C are diagrams for explaining other processing conducted in the case where there is no difference data at the time of a sending request.

When the return values (size successfully sent) from the TCP are equal as a result of sending to the A- and B-lines as described above, a difference is not generated. FIG. 21A shows the connection management table in this case. Next, the case where the difference occurs will be described.

FIG. 21A shows the connection management table at the time when there is no difference data (It regards that there is no difference data because three values of the A-line sending counter Send-A, the B-line sending counter Send-B, and the sending counter Send are equal to 1024 bytes.).

FIG. 21B shows the signal flow in the case where there has been sending of 256 bytes from the user application in this state. FIG. 21C shows the connection management table obtained after the sending. In this case, the value of Send is changed.

Figures 22A, 22B:
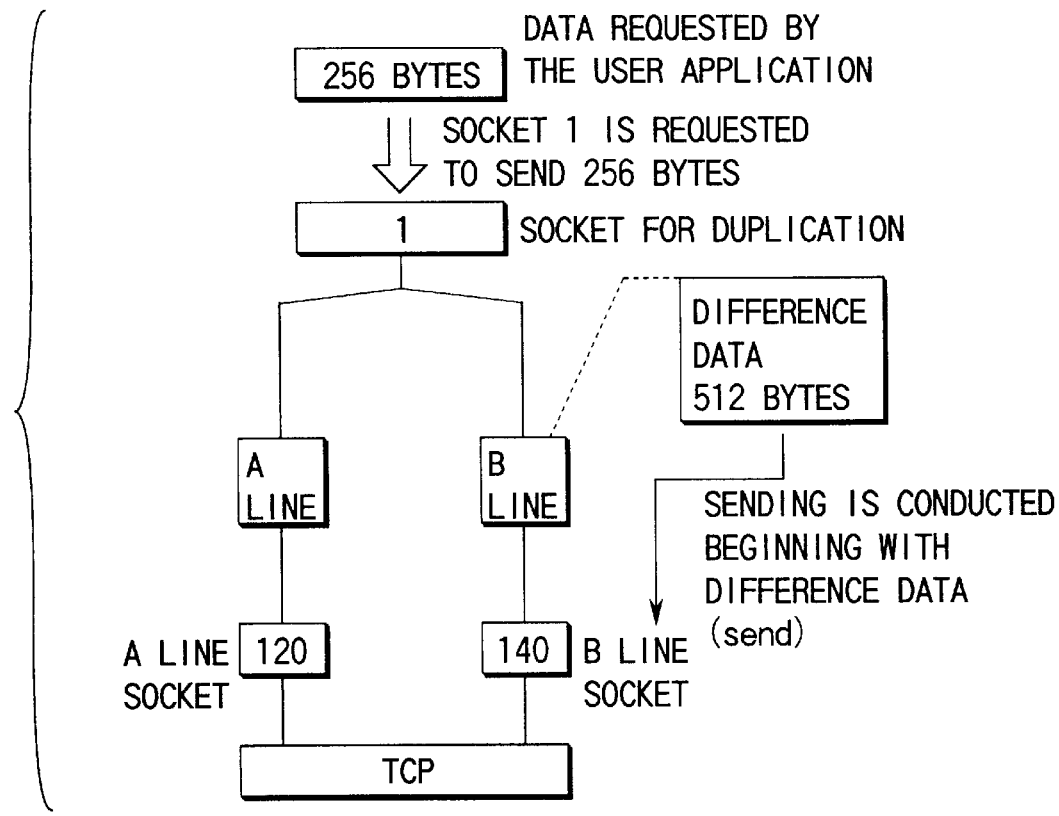
FIGS. 22A and 22B are diagrams for explaining the sending processing according to an embodiment of the present invention.

FIGS. 22A and 22B are diagrams for explaining the sending processing in the case where there is difference data.

It is now assumed that there has been a sending request of 256 bytes from the user application when there is difference data. As an example, it is now assumed that there has been difference data of 512 bytes in the B-line. FIG. 22A shows the connection management table in the case where there is difference data of 512 bytes in the B-line. It is assumed that the sending size of the A-line is 1024 bytes.

It is recognized that there is thus difference data in the B-line from the fact that the value of the B-line sending counter is smaller than the value of the A-line sending counter. The fact that the size of the difference is 512 bytes can be known from the subtraction between the A-line sending counter and the B-line sending counter.

In this case, difference data is first sent before sending data (256 bytes) supplied from the user application. FIG. 22B is a diagram showing the signal flow in this case.

Figure 23:
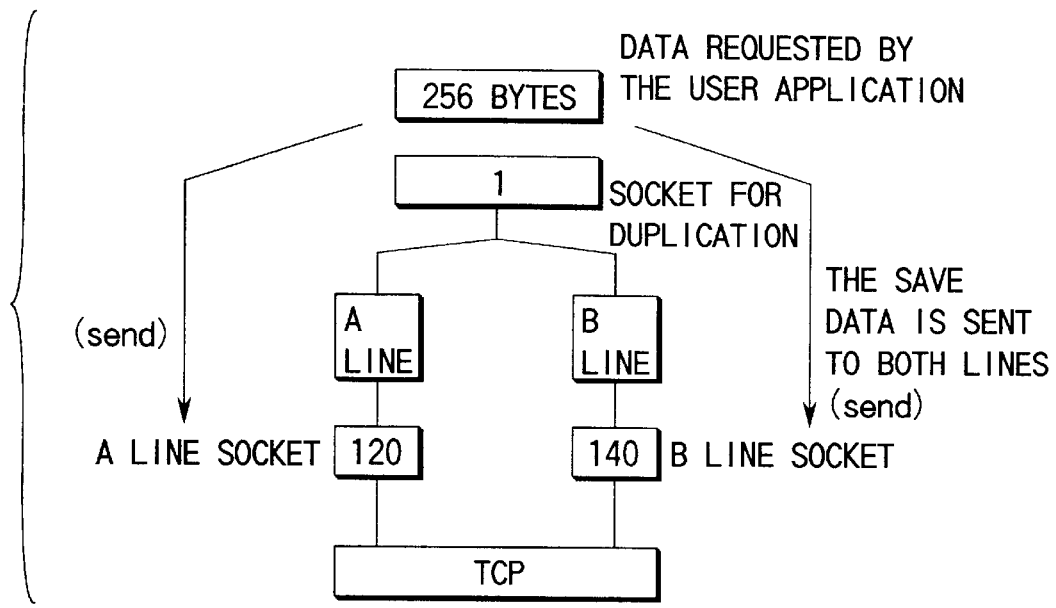
FIG. 23 is a diagram for explaining the sending processing according to an embodiment of the present invention.

FIG. 23 is a diagram for explaining the sending processing conducted in the case where the difference data has vanished as a result of the sending of the difference data.

In the case where the difference data has vanished as a result of the sending of the difference data, 256 bytes requested by the user application are sent to both lines.

Figure 24:
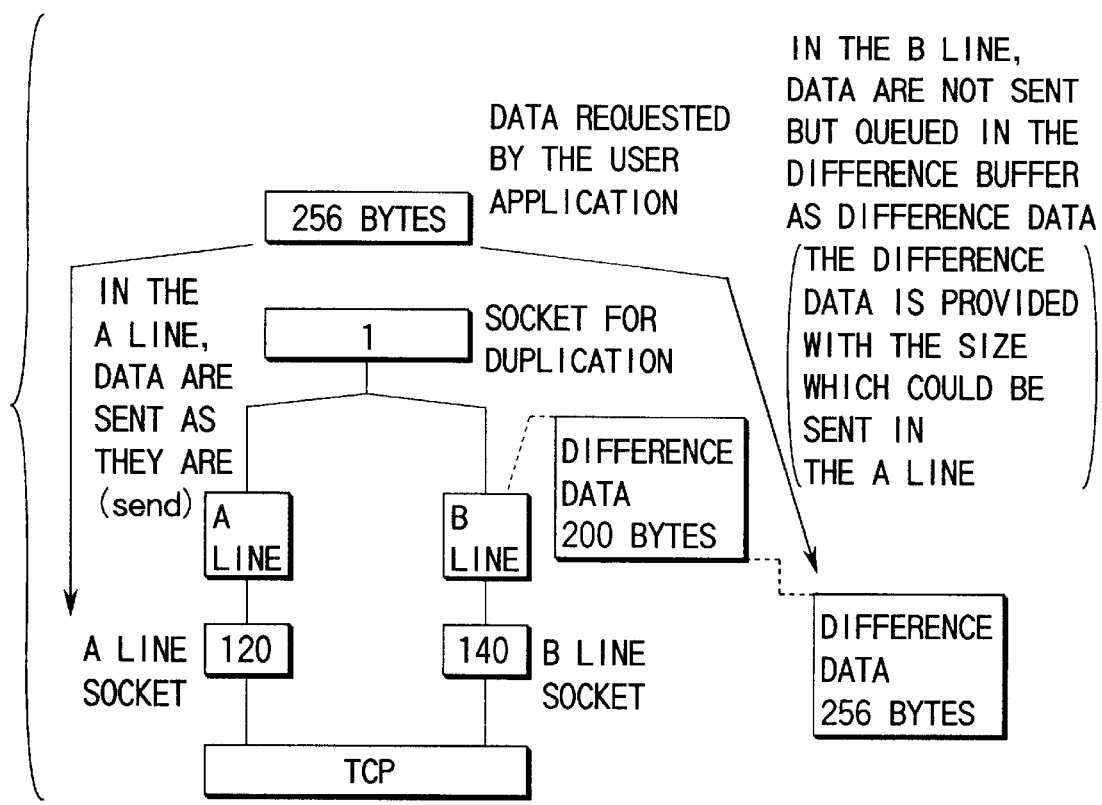
FIG. 24 is a diagram for explaining the sending processing according to an embodiment of the present invention.

FIG. 24 is a diagram for explaining the sending processing conducted in the case where there is still difference data as a result of the sending of the difference data.

In the case where there is still difference data of the B-line as a result of the sending of the difference data, 256 bytes requested by the user application are processed as follows. The A-line sends it as it is, and the B-line queues for the difference data (where the size of the difference data is the size successfully sent by the A-line).

FIG. 24 shows the signal flow in the case where the remainder of the difference data is 200 bytes as a result of the sending of the difference data, and the remainder has been successfully sent in 256 bytes to the A-line this time.

<Reception Processing (TCP) Z6>

An outline of the receiving processing (TCP), that is, receiving processing of a stream type (TCP) socket will now be described.

21) Data is received in the order of A-line and B-line.
22) As for the receiving processing of a system having difference data, only the difference data is first received. If the difference data is exhausted, new data is then received.
23) As for the receiving processing of the system having no difference data, only new data is received.
24) Upon receiving data, an n-line receiving counter and a receiving counter of the connection management table count up. In the case where only the difference data has been received, the receiving counter does not count up.
25) The received difference data is discarded. The user application is notified of newly received data.
26) In the case where the difference data is to be received, a dummy buffer for receiving is used. In the case where new data is to be received, a receiving buffer specified by the user application is used.

Here, the "new data" refers to data which is not discarded. The "difference" data refers to data which has been received by one line, but which has not been received by the other line.

Hereafter, the receiving processing heretofore described will be described concretely in reference to FIGS. 25A to 27B.

Figures 25A, 25B, 25C:
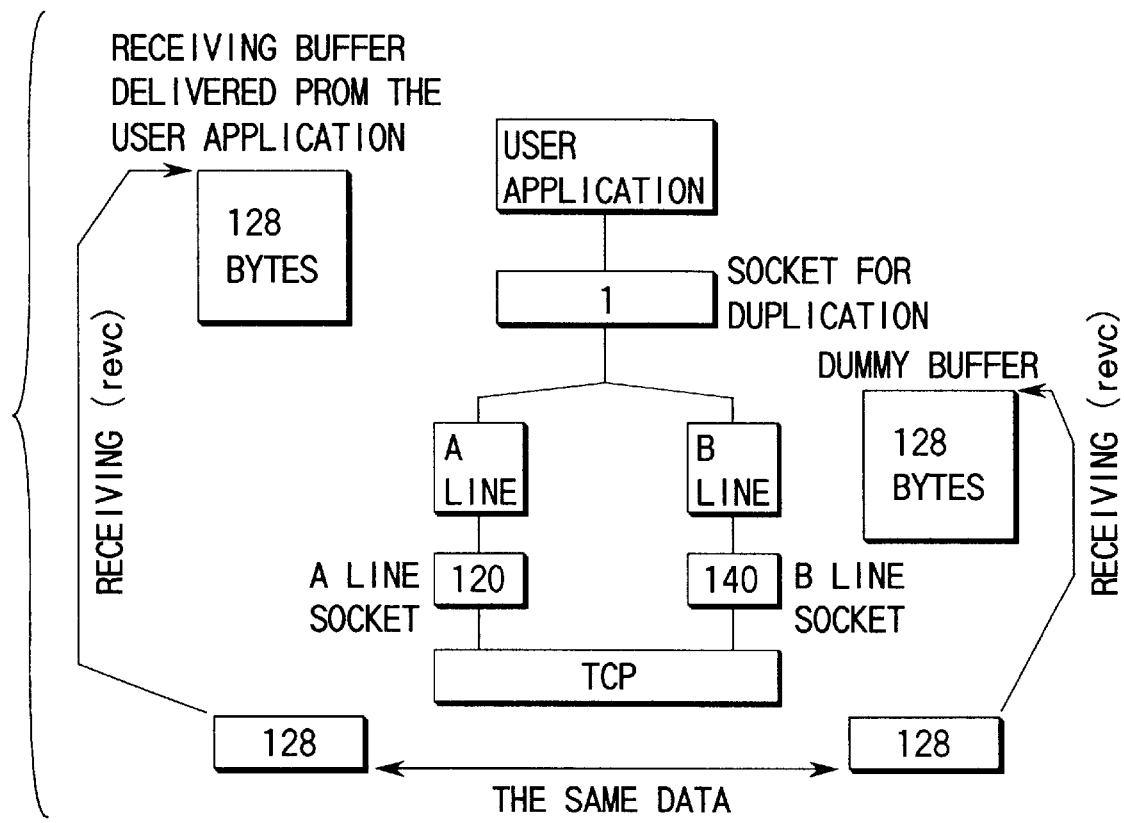
FIGS. 25A to 25C are diagrams for explaining the receiving processing according to an embodiment of the present invention.

FIGS. 25A to 25C are diagrams showing the receiving processing conducted when there is no difference.

a) FIG. 25A shows the connection management table obtained when the A- and B-lines are receiving 1024 bytes after the A- and B-lines received data of 128 bytes when there were no difference in the receiving size.

FIG. 25B is a diagram showing the receiving processing conducted when there is no difference. Data are read from in the order of the A-line to B-line. Since the A-line becomes new data, it is received from the TCP by using a receiving buffer delivered from the user application. Since the data of B-line becomes the difference data after the receiving data of the A-line, it is received from the TCP by using a dummy buffer for receiving.

FIG. 25C shows the state of the connection management table obtained after receiving data.

FIGS. 26A to 26D are diagrams for explaining the receiving processing conducted when there is a difference between received data.

b) FIG. 26A shows the case where both lines have received data of 256 bytes when there is a difference in receiving. As an example, it is now assumed that there is a difference of 128 bytes in the A-line. The state of the connection management table in the case where there is difference data of 128 bytes in the A-line is shown. It is assumed that the received size of the B-line is 1024 bytes.

Figures 26B, 26C, 26D:
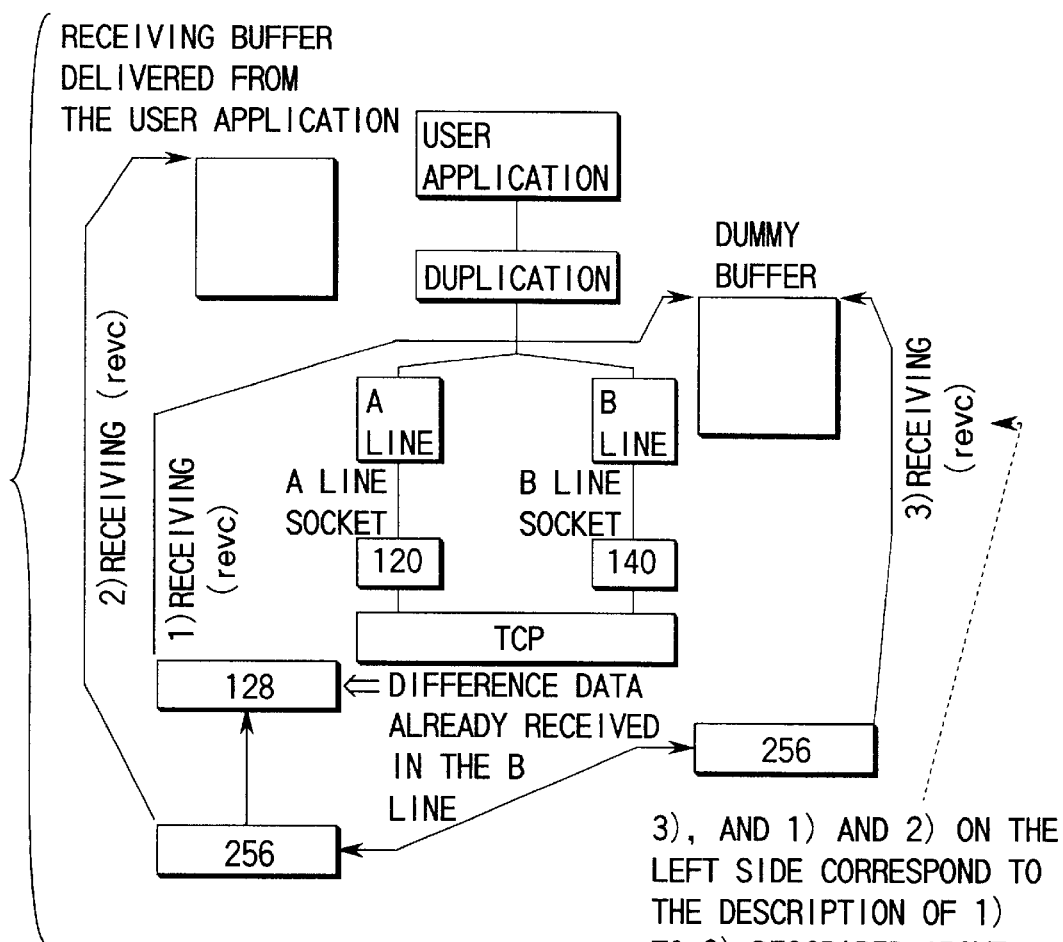

It can be recognized that there is difference data in the A-line from the fact that the A-line receiving counter value is smaller than the receiving count value (corresponding to Recv of FIG. 26A) in FIG. 26B. It is known that the size of the difference is 128 bytes by subtracting the value of the A-line receiving counter from the value of the receiving counter.

In FIG. 26B, processing is conducted in the following order.

41) Data are read out in the order of A-line to B-line. Since the A-line is a line having a difference, data corresponding to the difference size is first received from the TCP by using the dummy buffer for receiving.
42) After receiving the difference data, new data is received. The new data is received from the TCP by using the receiving buffer delivered from the user application.
43) Since data of the B-line becomes difference data after receiving in the A-line, it is received from the TCP by using the dummy buffer delivered from the user application.

FIG. 26C shows the state of the connection management table obtained after A-line receiving in 41). FIG. 26D shows the state of the connection management table obtained after B-line receiving in 42).

Here, the difference and the difference calculation method are as follows.

51) Method of determining which system has a difference
   a) If the receiving counter is equal to the A-line receiving counter, it follows that A-line receiving counter>B-line receiving counter, and there is a difference in the B-line.
   b) If the receiving counter is equal to the B-line receiving counter, it follows that A-line receiving counter<B-line receiving counter, and there is a difference in the A-line.
   c) If the receiving counter, the A-line receiving counter and the B-line receiving counter are equal to each other, it follows that A-line receiving counter=B-line receiving counter, and there is no difference.

52) Difference calculation method
   a) In the case where (large system counter value>small system counter value)
      difference=large system counter value−small system counter value
   b) In the case where (large system counter value<small system counter value) difference=$2^{31}$−(small system counter value large system counter value)

<Processing Z7 for Cutting Off One Line of the Connection>

Figures 27A, 27B:
FIGS. 27A and 27B are diagrams for explaining the processing for cutting off one line of a connection according to an embodiment of the present invention.

The processing for cutting off one line of the connection will now be described in reference to FIGS. 27A and 27B.

In the case where an abnormality of one line has been detected during connections of both lines in the duplexing processing, processing for cutting off the connection is conducted.

Here, the "abnormality of one line" indicates, for example, the following two items:
   x) when the difference of the sending data has become 1 mega-bytes or more; and
   y) when cut-off of the connection has been detected due to an error at the time of sending request (in the case where the system of the other party has already been cut off).

After the connection of one line has been cut off, the fields of the connection management table are initialized. FIGS. 27A and 27B show connection management tables when the connection of one line has been cut off. FIG. 27A shows the connection management table obtained when both lines are normal. FIG. 27B shows the connection management table obtained when the connection of one line has been cut off.

<Connection Reestablishing Processing Z8>

By referring to FIGS. 28A and 28B, the connection reestablishing request at the time of the sending request will now be described. FIG. 28A is a diagram showing the operation conducted when reestablishing the connection at the time of sending. In the case where the connection of one line is cut off, the connection of the cut-off system is reestablished in the duplexing processing. As for the timing of conducting the reestablishment, the reestablishment is conducted when the user has requested the sending (TCP) or receiving (TCP).

As the processing for reestablishing the connection, the following is conducted at the time of the sending or receiving request.

61) An A/B line communication status and an internal processing status are checked. In the case of an abnormality, the reestablishing processing is not conducted. Only in the case of normality, the reestablishing processing is conducted.
62) On the basis of the connection management table, the reestablishing processing is not conducted in the case where the socket is "server side". The reestablishing processing is conducted only from a client side (the side which has established the connection).
63) The connection management table is checked. In the case of such a state that a connection establishing request can be issued, a socket is acquired and bound with its own port number of the normal line and the connection establishing request is issued. The diagnosis of the state capable of issuing the connection establishing request is conducted as shown in FIG. 28B. At this time, the normal line conducts the sending or receiving processing.

FIG. 28B is a diagram showing a result of deciding whether the state allows the connection reestablishment, on the basis of the connection management table. In FIG. 28B, ○ indicates that a value is already set, X indicates a "not yet used" state (a state containing −1), and− indicates that any value will do.

At the time of (2) in FIG. 28B, the connection reestablishing request is issued. At the time of (3), confirmation of a connection is conducted for the connection establishing request. At the time of (1) and (4), any operation is not conducted.

<Processing Z9 After Connection Establishment>

The processing conducted after connection establishment will now be described in reference to FIGS. 29A to 33B.

When a connection has newly been established (including reestablishment), processing of conveying the sending size of a system (simply referred to as opposite line) opposite to the line which has established the connection to the other party of the connection is conducted in the duplexing processing.

This processing is conducted when it is recognized that the connection has been achieved. As for the receiving of the first time after the establishment of the connection, only the header is read out on the receiving side. Until the opposite line receives the data corresponding to the sending size contained in the header, the receiving processing is not conducted.

The processing heretofore described will now be described in reference to FIGS. 29A to 33B.

Figures 29A, 29B, 29C:
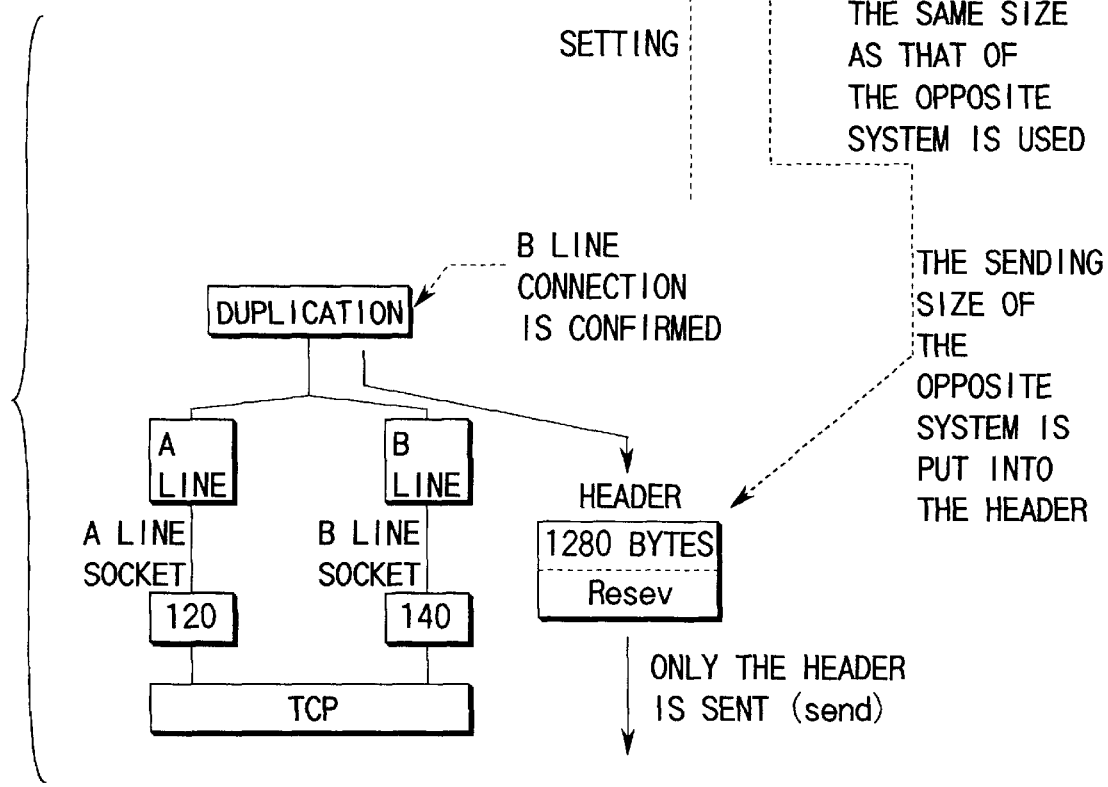
FIGS. 29A to 29C are diagrams for explaining the processing conducted after establishment of a connection according to an embodiment of the present invention.

FIGS. 29A to 29C are diagrams for explaining the sending processing conducted after the connection establishment. FIGS. 29A and 29B are diagrams showing the connection management table in the case where the connection of the B-line is not established (reestablished) and the connection management table in the case where the connection of the B-line has been established (reestablished), respectively. FIG. 29C is a diagram showing the sending processing conducted after the connection has been established.

FIGS. 30A and 30B are diagrams for explaining the receiving processing conducted after the connection has been established. FIG. 30A is a diagram showing the connection management table obtained in the case where the connection of the B-line has been established (reestablished). FIG. 30B is a diagram showing the header receiving conducted after the connection has been established.

As shown in FIGS. 30A and 30B, the sending size of the other party is read from the header and stored in the connection management table after receiving. As for the receiving, receiving from the TCP is conducted by using the dummy buffer for receiving.

Figures 31A, 31B:
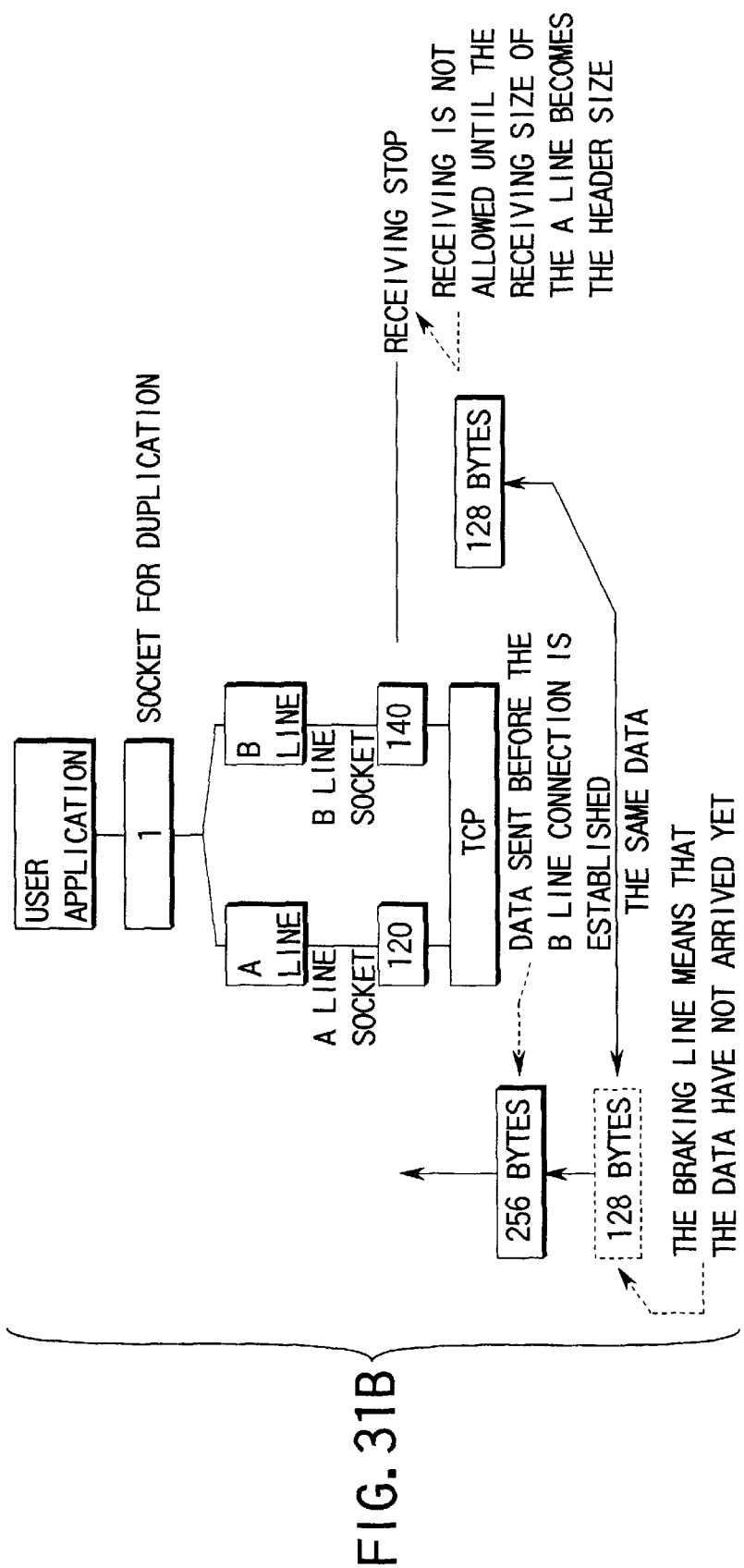
FIGS. 31A and 31B are diagrams for explaining the processing conducted after establishment of a connection according to an embodiment of the present invention.

FIGS. 31A and 31B are diagrams for explaining the receiving waiting processing of the other party line conducted after the header receiving. FIG. 31A is a diagram showing the connection management table at that time. FIG. 31B is a diagram showing the header receiving conducted after the connection has been established. Upon receiving the header, receiving is waited until data corresponding to the sending size of the other party line contained in the header have been received. In this example, the B-line does not conduct the receiving processing until the A-line receives 1280 bytes. In the case where the size contained in the header is −1, waiting is not conducted.

Figures 32A, 32B:
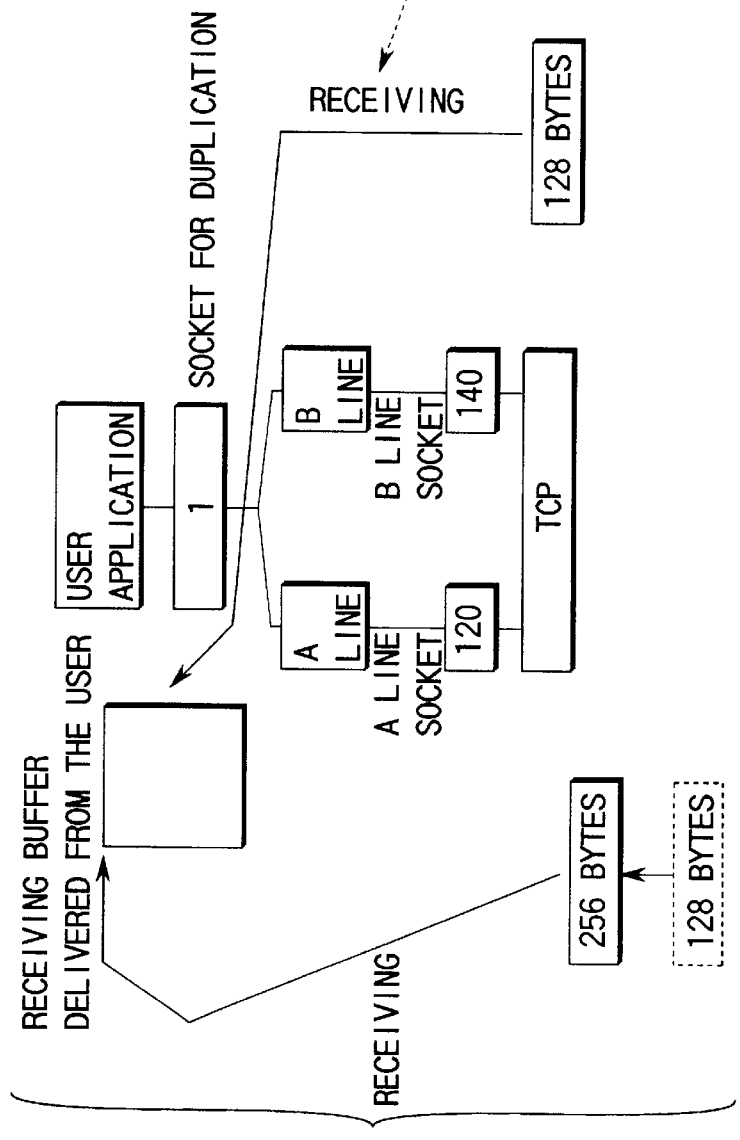
FIGS. 32A and 32B are diagrams for explaining the processing conducted after establishment of a connection according to an embodiment of the present invention.

FIGS. 32A and 32B are diagrams for explaining the resumption of the ordinary receiving processing. FIG. 32A is a diagram showing the connection management table obtained at that time. FIG. 32B is a diagram showing the header receiving conducted after the connection has been established. After data corresponding to the sending size of the other party line contained in the header have been received, the ordinary receiving processing is conducted. In this example, the ordinary receiving processing is resumed when the A-line has received 1280 bytes.

FIGS. 33A and 33B are diagrams for explaining a decision method of waiting release. FIG. 33A is a diagram showing patterns of the value magnitude relation between both counters. FIG. 33B is a diagram for explaining the decision method of waiting release. As for the decision method of waiting release of the opposite line, decision is made on the basis of whether the sending size of the other party contained in the header is greater than the receiving counter of the If opposite line as shown in FIG. 33A. In addition, a return to is conducted when 2 giga-bytes is reached, because the counter has 32 bits (31 bits among them are used). Therefore, the decision method differs depending on whether the counter has made one round. As for the value magnitude relation between both counters, there are five patterns as shown in FIG. 33A. FIG. 33B is a diagram for explaining the decision method of waiting release. As for the difference between both counters, a difference greater than n Mbytes is represented as "large." Otherwise, the difference is represented as "small." In other words, "large" corresponds to the case where either counter has made one round, and "small" corresponds to the case where neither of the counters has made one round.

The outline of the operation of the transmission line duplexing processing method according to the present invention will now be described.

1) As described before in <Connection establishing processing>, the connection establishing side uses the same port number in two established connections.
2) By using both transmission lines, two connections are established.
3) Upon establishment of the connections, the number of data bytes currently received on the connection of the opposite line for each of the connections are sent as described before in <Processing after connection establishment>. Here, the sent data is referred to as head data.
4) In the case where the connections of both transmission lines are already established, the same data is sent to both connections as described before in <Sending processing>.
5) In the case where sending in one of the lines has failed as a result of sending on both transmission lines, that data is stored in a buffer. Hereafter, this buffer is referred to as difference buffer, and data stored in the difference buffer is referred to as sending difference data. At the time of a next sending request, this difference data is sent.
6) On the receiving side, the data are conveyed to the application in the order of arrival as described before in <Receiving processing>. A counter for managing the received data size by taking a connection as the unit is provided. Upon receiving the data, the counter counts up.
7) Decision as to whether data should be discarded in the order of arrival is conducted on the basis of the counter used in 6). With regard to this, a concrete example will now be described. It is now assumed that the receiving counter of one of the transmission lines (referred to as transmission line A) is 100 bytes and the receiving counter of the other of the transmission lines (referred to as transmission line B) is 50 bytes. In the case where data of 1 bytes have been received via the transmission line B at this time, the former half of 50 bytes is discarded because it is the data for which the receiving notification was already conducted on the transmission line A. The latter half of 50 bytes is newly received data, and consequently it is conveyed to the application. In this way, the difference with respect to the opposite line is first received, and the data is discarded. Data received more than the opposite line is conveyed to the application.
8) If the sending difference data stored in 5) exceeds the capacity of the difference buffer, then the transmission line of the connection holding that difference buffer is judged to be abnormal, and the connection is cut off.
9) In the case where an abnormality of one of the transmission lines is detected as described in 8) and the connection is cut off inside as described in <Processing for cutting off one line of the connection>, a connection reestablishing request is periodically conducted. In the case where the transmission line is restored to normal and the connection has been established, sending and receiving are conducted by using both transmission lines again.
1) When the connection has been reestablished, the header data described in 3) is received as described before in <Processing after connection establishment>. Until the transmission line (the system which has been used normally) receives data corresponding to the receiving size contained in the header data, the reestablished connection is not used. After the opposite line has received the data corresponding to the receiving size contained in the header, the reestablished connection is used. This aims at preventing the stream data from being destroyed.

In the transmission duplexing processing method, the embodiment heretofore described makes it possible to continue the transmission without waiting for the termination of the retry of the TCP (without stopping the transmission)

even in the case where an abnormality has occurred in one of the transmission lines.

While the present invention has been described as a transmission line duplexing processing method, the present invention may be a recording medium for recording the program which processes this method, or may be an apparatus for processing this method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission line duplexing processing method comprising the steps of:

installing a duplex transmission line between a plurality of terminal devices, said duplex transmission line being duplicated by first and second transmission lines;

making it possible to send and receive data of a stream unit train between said terminal devices by using a TCP protocol;

sending the data of said stream unit train simultaneously to each of duplicated said first and second transmission lines;

receiving data, and handling only data which is included in the data sent at said sending step and which has arrived earlier, as received data;

detecting an abnormality caused on either of said first and second transmission lines; and responding to detection of occurrence of the abnormality on the transmission line conducted at said abnormality detecting step, to close the transmission line having the abnormality and conduct sending and receiving by using a remaining normal transmission line.

2. A transmission line duplexing processing method according to claim 1, further comprising the step of responding to detection of occurrence of an abnormality on a transmission line conducted at said abnormality detecting step, to store said data obtained immediately before the occurrence of the abnormality.

3. A transmission line duplexing processing method according to claim 1, wherein said receiving step comprises the step of measuring receiving data size for each of said transmission lines when receiving data, deriving a difference between them, receiving only data of said difference, and receiving new data after disappearance of said difference.

4. A transmission line duplexing processing method according to claim 1, wherein said abnormality detecting step comprises the step of measuring receiving data size for each of said transmission lines when sending data, deriving a difference between them, and judging said transmission line storing said difference to be abnormal when data of said difference has exceeded a prescribed value.

5. A transmission line duplexing processing method according to claim 1, further comprising the step of responding to detection of occurrence of an abnormality on a transmission line conducted at said abnormality detecting step and closing of the transmission line having the detected abnormality, to periodically request reestablishment of both of said transmission lines, and responding to restoration of the transmission line having the detected abnormality to a normal state and reestablishment of said closed transmission line, to conduct sending and receiving by using both of said transmission lines again.

6. A transmission line duplexing processing method according to claim 5, further comprising the step of receiving head data when said closed transmission line has been reestablished, preventing said reestablished transmission line from being used until receiving data corresponding to the receiving size contained in receiving unit of a normal transmission line, and using reestablished both transmission lines only when an opposite line has received data corresponding to the receiving size contained in the header.

7. A recording medium for recording a program which is readable by a computer, said program executing processes of:

installing a duplex transmission line between a plurality of terminal devices, said duplex transmission line being duplicated by first and second transmission lines;

making it possible to send and receive data of a stream unit train between said terminal devices by using a TCP protocol;

sending the data of said stream unit train simultaneously to each of duplicated said first and second transmission lines;

receiving data, and handling only data which is included in the data sent at said sending step and which has arrived earlier, as received data;

detecting an abnormality caused on either of said first and second transmission lines; and responding to detection of occurrence of the abnormality on the transmission line conducted at said abnormality detecting step, to close the transmission line having the abnormality and conduct sending and receiving by using a remaining normal transmission line.

8. A recording medium according to claim 7, wherein said program further comprises the process of responding to detection of occurrence of an abnormality on a transmission line conducted at said abnormality detecting step, to store said data obtained immediately before the occurrence of the abnormality.

9. A recording medium according to claim 7, wherein said receiving process of said program comprises the process of measuring receiving data size for each of said transmission lines when receiving data, deriving a difference between them, receiving only data of said difference, and receiving new data after disappearance of said difference.

10. A recording medium according to claim 7, wherein said abnormality detecting process of said program comprises the process of measuring receiving data size for each of said transmission lines when sending data, deriving a difference between them, and judging said transmission line storing said difference to be abnormal when data of said difference has exceeded a prescribed value.

11. A recording medium according to claim 7, wherein said program further comprises the process of responding to detection of occurrence of an abnormality on a transmission line conducted by said abnormality detecting process and closing of the transmission line having the detected abnormality, to periodically request reestablishment of both of said transmission lines, and responding to restoration of the transmission line having the detected abnormality to a normal state and reestablishment of said closed transmission line, to conduct sending and receiving by using both of said transmission lines again.

12. A recording medium according to claim 11, wherein said program further comprises the process of receiving head data when said closed transmission line has been reestablished, preventing said reestablished transmission line from being used until receiving data corresponding to the receiving size contained in receiving unit of a normal transmission line, and using reestablished both transmission lines only when an opposite line has received data corresponding to the receiving size contained in the header.

13. A transmission line duplexing processing apparatus comprising:

a duplex transmission line installed between a plurality of terminal devices and duplicated by first and second transmission lines;

a transmission line establishing unit for making it possible to send and receive data of a stream unit train between said terminal devices by using a TCP protocol;

a sending unit for sending the data of said stream unit train simultaneously to each of duplicated said first and second transmission lines;

a receiving unit for handling only data which is included in the data sent at said sending step and which has arrived earlier, as received data;

a detecting unit for detecting an abnormality caused on either of said first and second transmission lines; and a transmission switching unit responding to detection of occurrence of the abnormality on the transmission line conducted at said abnormality detecting step, to close the transmission line having the abnormality and conduct sending and receiving by using a remaining normal transmission line.

* * * * *